(12) United States Patent
Bierwirth et al.

(10) Patent No.: US 9,511,738 B2
(45) Date of Patent: Dec. 6, 2016

(54) INFLATOR AND AIRBAG MODULE

(71) Applicant: TRW Airbag Systems GmbH, Aschau am Innl (DE)

(72) Inventors: Sebastian Bierwirth, Rechtmehring (DE); Achim Hofmann, Tussling (DE); Hans-Peter Neumayer, Ampfling (DE); Dieter Spitzenberger, Krailburg (DE); Hannes Nuiding, Kaisersbach (DE); Thomas Schober, Haag (DE); Josef Bommer, Soyen (DE); Tobias Breddermann, Muhldorf am inn (DE); Dietmar Schwebel, Aschau a. Inn (DE)

(73) Assignee: TRW Airbag Systems GmbH (DE)

( * ) Notice: Subject to any disclaimer, the term of this patent is extended or adjusted under 35 U.S.C. 154(b) by 0 days.

(21) Appl. No.: 14/930,936

(22) Filed: Nov. 3, 2015

(65) Prior Publication Data
US 2016/0052484 A1 Feb. 25, 2016

Related U.S. Application Data

(62) Division of application No. 13/878,827, filed as application No. PCT/DE2011/001820 on Sep. 27, 2011, now abandoned.

(30) Foreign Application Priority Data

Oct. 15, 2010 (DE) .................... 20 2010 014 286 U

(51) Int. Cl.
*B60R 21/261* (2011.01)
*B60R 21/26* (2011.01)
*B60R 21/264* (2006.01)

(52) U.S. Cl.
CPC ........... *B60R 21/261* (2013.01); *B60R 21/264* (2013.01); *B60R 21/2644* (2013.01);
(Continued)

(58) Field of Classification Search
CPC ...... B60R 21/26; B60R 21/261; B60R 21/263; B60R 21/264; B60R 21/2644; B60R 21/26005; B60R 2021/26011; B60R 2021/2648; B60R 2021/2642; B60R 2021/26029; B60R 2021/26076
See application file for complete search history.

(56) References Cited

U.S. PATENT DOCUMENTS

| 3,986,456 A | 10/1976 | Doin et al. |
| 4,886,293 A | 12/1989 | Weiler et al. |

(Continued)

FOREIGN PATENT DOCUMENTS

| DE | 1136330 | 9/2001 |
| DE | 10125354 | 12/2002 |

(Continued)

*Primary Examiner* — Barry Gooden, Jr.
(74) *Attorney, Agent, or Firm* — Tarolli, Sundheim, Covell & Tummino LLP

(57) ABSTRACT

An inflator for a protective device in a vehicle includes a diffuser (10) forming a substantially rotation-symmetric external housing of the inflator with a closing member (12), wherein the diffuser (10) includes a plurality of discharge orifices (78) arranged in a row, and which are of circular shape. The inflator also includes a filter (46) and a combustion chamber component at least partially enclosing at least one of a combustion chamber (56) and a combustion chamber sleeve (60), wherein the filter (46) extends in a ring-shaped manner about the combustion chamber (56) and, at a position of its ring-shaped extension, includes a critical filter portion (120) which is closer to the combustion chamber component than the remaining filter areas situated at its ring-shaped extension, wherein the critical filter portion (120) has a reduced thickness compared to areas of the filter that are adjacent to the critical filter portion (120).

20 Claims, 16 Drawing Sheets

(52) U.S. Cl.
CPC .............. *B60R 2021/26011* (2013.01); *B60R 2021/26029* (2013.01); *B60R 2021/2648* (2013.01)

(56) References Cited

U.S. PATENT DOCUMENTS

| | | | |
|---|---|---|---|
| 5,056,815 | A | 10/1991 | Geisreiter |
| 5,199,741 | A | 4/1993 | Swann et al. |
| 5,439,250 | A | 8/1995 | Kokeguchi et al. |
| 5,480,182 | A | 1/1996 | Lauritzen et al. |
| 5,582,427 | A * | 12/1996 | Rink .................. B60R 21/2644 102/531 |
| 5,613,705 | A * | 3/1997 | Hock .................. B60R 21/2644 280/736 |
| 5,634,660 | A | 6/1997 | Fink et al. |
| 5,700,973 | A * | 12/1997 | Siddiqui .................. B01D 39/06 102/530 |
| 5,752,715 | A * | 5/1998 | Pripps .................. B60R 21/2171 280/732 |
| 6,068,291 | A | 5/2000 | Lebaudy et al. |
| 6,068,294 | A | 5/2000 | Jordan |
| 6,155,171 | A | 12/2000 | Haegeman et al. |
| 6,189,927 | B1 * | 2/2001 | Mossi .................. B60R 21/2644 280/736 |
| 6,196,581 | B1 | 3/2001 | Katsuda et al. |
| 6,406,053 | B1 | 6/2002 | Bayer et al. |
| 6,422,146 | B1 | 7/2002 | Vetter |
| 6,474,684 | B1 * | 11/2002 | Ludwig .................. B60R 21/2644 280/736 |
| 6,669,230 | B1 | 12/2003 | Nakashima et al. |
| 6,722,694 | B1 * | 4/2004 | Nakashima .................. B01D 46/24 280/731 |
| 6,764,096 | B2 * | 7/2004 | Quioc .................. B60R 21/2644 280/736 |
| 6,796,245 | B2 * | 9/2004 | Parker .................. B60R 22/4628 102/202.1 |
| 6,860,511 | B2 * | 3/2005 | Patterson .................. B60R 21/2644 280/741 |
| 6,886,856 | B2 * | 5/2005 | Canterberry .................. B60R 21/2644 102/531 |
| 7,007,971 | B2 * | 3/2006 | Koga .................. B60R 21/2644 280/736 |
| 7,017,944 | B2 * | 3/2006 | Edwards, II .................. B60R 21/2644 137/72 |
| 7,823,919 | B2 * | 11/2010 | Jackson .................. B01D 39/12 280/736 |
| 7,887,091 | B1 * | 2/2011 | Cox .................. B60R 21/264 280/736 |
| 8,011,303 | B2 * | 9/2011 | Nakayasu .................. B60R 21/2644 102/530 |
| 8,382,155 | B2 * | 2/2013 | Nakayasu .................. B60R 21/2644 102/530 |
| 8,556,294 | B1 | 10/2013 | Norman, III .................. B60R 21/263 102/531 |
| 8,740,245 | B2 * | 6/2014 | Fukawatase .................. B60R 21/2644 280/736 |
| 8,783,188 | B1 * | 7/2014 | Mayville .................. B60R 21/26 102/530 |
| 8,827,308 | B1 * | 9/2014 | Lewis .................. B60R 21/263 102/530 |
| 2001/0033075 | A1 * | 10/2001 | Soderquist .................. B60R 21/261 280/736 |
| 2002/0101068 | A1 * | 8/2002 | Quioc .................. B60R 21/2644 280/741 |
| 2002/0135172 | A1 * | 9/2002 | Koga .................. B60R 21/2644 280/741 |
| 2002/0144621 | A1 * | 10/2002 | McFarland .................. B60R 21/2644 102/530 |
| 2002/0162476 | A1 | 11/2002 | Parker et al. |
| 2002/0167155 | A1 * | 11/2002 | Nakashima .................. B01D 46/24 280/741 |
| 2003/0025309 | A1 * | 2/2003 | Schenck .................. B60R 21/276 280/735 |
| 2003/0051630 | A1 | 3/2003 | Katsuda et al. |
| 2003/0057686 | A1 * | 3/2003 | Goetz .................. B60R 21/217 280/736 |
| 2003/0132621 | A1 | 7/2003 | Arieth et al. |
| 2003/0146611 | A1 * | 8/2003 | Kenney .................. B60R 21/2644 280/736 |
| 2004/0124618 | A1 | 7/2004 | Schonhuber et al. |
| 2004/0163565 | A1 * | 8/2004 | Gabler .................. B60R 21/2644 102/530 |
| 2004/0232680 | A1 * | 11/2004 | Goetz .................. B60R 21/261 280/742 |
| 2005/0156420 | A1 * | 7/2005 | Edwards, II .................. B60R 21/2644 280/741 |
| 2005/0184498 | A1 * | 8/2005 | Trevillyan .................. B60R 21/2644 280/741 |
| 2005/0225064 | A1 * | 10/2005 | Suehiro .................. B60R 21/2644 280/741 |
| 2006/0082113 | A1 | 4/2006 | Smith et al. |
| 2006/0117982 | A1 * | 6/2006 | Blessing .................. B60R 21/2644 102/530 |
| 2006/0290108 | A1 * | 12/2006 | O'Loughlin .................. B60R 21/264 280/728.1 |
| 2007/0001439 | A1 | 1/2007 | Matsuda et al. |
| 2007/0057496 | A1 * | 3/2007 | Matsuda .................. B60R 21/2644 280/737 |
| 2007/0085314 | A1 * | 4/2007 | Matsuda .................. B60R 21/261 280/740 |
| 2007/0120349 | A1 | 5/2007 | Hoffman et al. |
| 2007/0257477 | A1 * | 11/2007 | Ohji .................. B60R 21/264 280/741 |
| 2007/0273132 | A1 * | 11/2007 | Smith .................. B60R 21/2644 280/736 |
| 2008/0136152 | A1 | 6/2008 | McFarland |
| 2008/0211215 | A1 | 9/2008 | Hoffman et al. |
| 2008/0257195 | A1 * | 10/2008 | Nakayasu .................. B60R 21/2644 102/530 |
| 2009/0066067 | A1 * | 3/2009 | Meissner .................. B60R 21/217 280/735 |
| 2009/0115175 | A1 * | 5/2009 | Nishimura .................. B60R 21/2644 280/741 |
| 2009/0295132 | A1 * | 12/2009 | Jackson .................. B01D 39/12 280/736 |
| 2010/0071580 | A1 * | 3/2010 | Nakayasu .................. B60R 21/261 102/530 |
| 2010/0078922 | A1 * | 4/2010 | Sparkman .................. B60R 21/264 280/737 |
| 2010/0201111 | A1 * | 8/2010 | Yamazaki .................. B60R 21/261 280/741 |
| 2011/0169254 | A1 * | 7/2011 | Bert .................. G06F 11/2033 280/741 |
| 2011/0193330 | A1 * | 8/2011 | Kobayashi .................. B60R 21/2644 280/741 |
| 2011/0221175 | A1 * | 9/2011 | Kobayashi .................. B60R 21/2644 280/741 |
| 2011/0221176 | A1 | 9/2011 | Bierwirth et al. |
| 2011/0239891 | A1 * | 10/2011 | Nakayasu .................. B60R 21/2644 102/530 |
| 2011/0254255 | A1 * | 10/2011 | Chen .................. B60R 21/2644 280/741 |
| 2012/0247361 | A1 * | 10/2012 | Kobayashi .................. B60R 21/2644 102/530 |
| 2013/0200600 | A1 * | 8/2013 | Bierwirth .................. B60R 21/261 280/740 |
| 2013/0233196 | A1 * | 9/2013 | Kobayashi .................. B60R 21/2644 102/530 |

FOREIGN PATENT DOCUMENTS

| | | |
|---|---|---|
| DE | 20320653 | 11/2004 |
| DE | 102008019863 | 11/2009 |
| DE | 102008033442 | 1/2010 |
| DE | 102008049652 | 4/2010 |
| EP | 0773145 | 5/1997 |
| EP | 1155927 | 11/2001 |
| EP | 1217325 | 6/2002 |
| EP | 1568547 | 8/2005 |

(56) References Cited

FOREIGN PATENT DOCUMENTS

| EP | 1157050 | 9/2005 |
|---|---|---|
| WO | 0147752 | 7/2001 |
| WO | 2009146221 | 12/2009 |

* cited by examiner

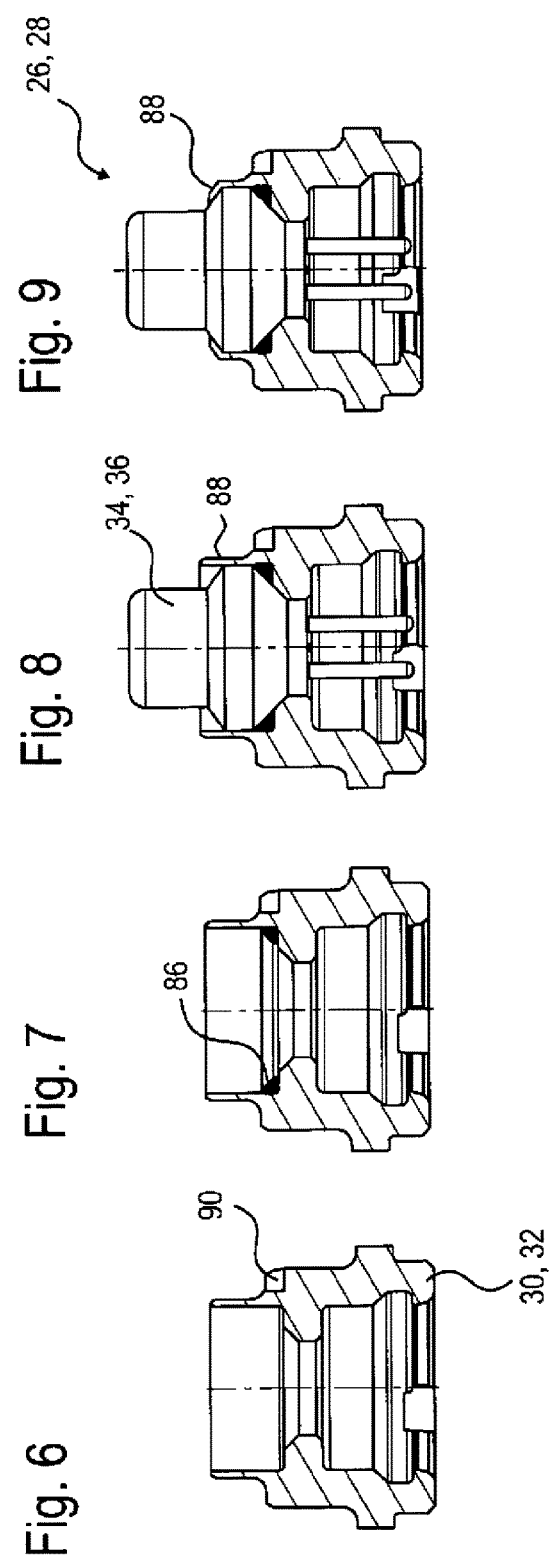

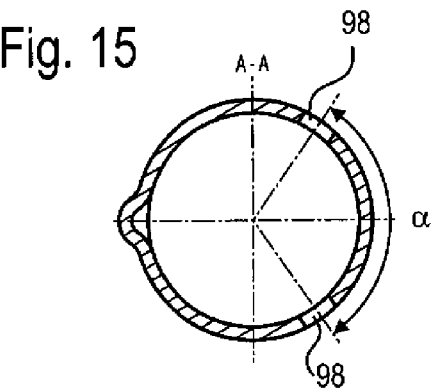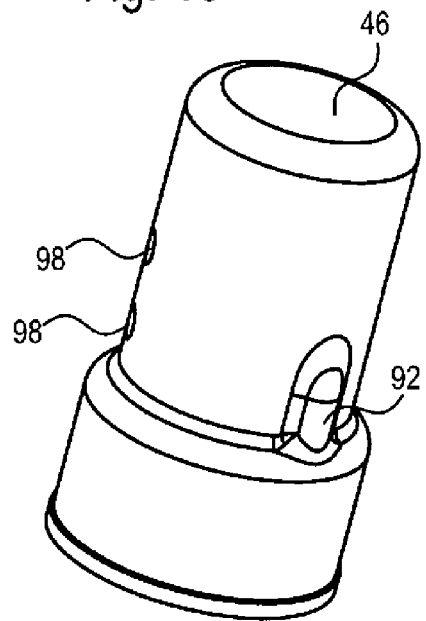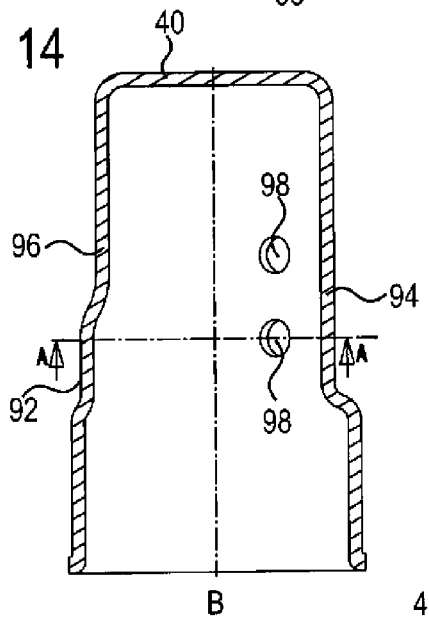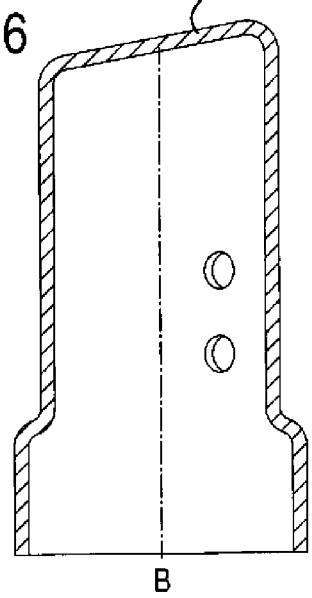

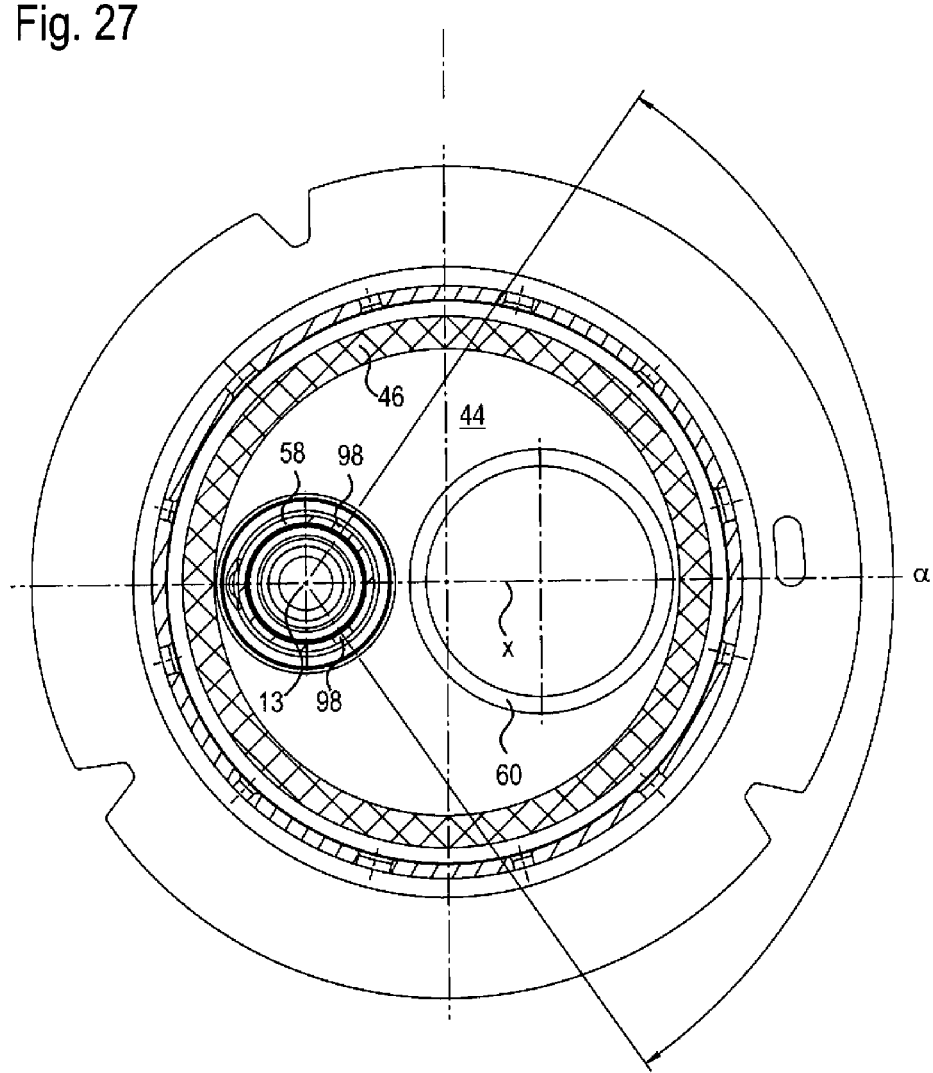

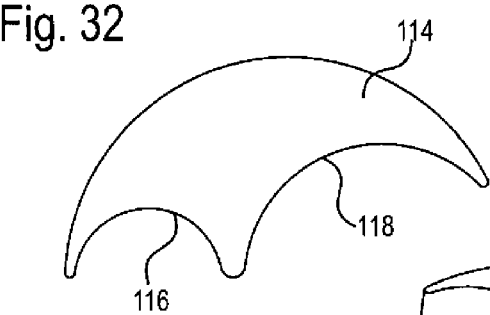
Fig. 32
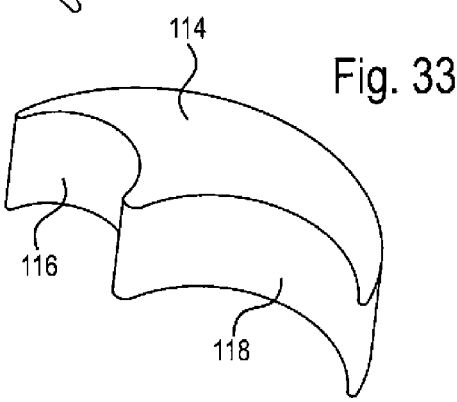
Fig. 33
Fig. 34
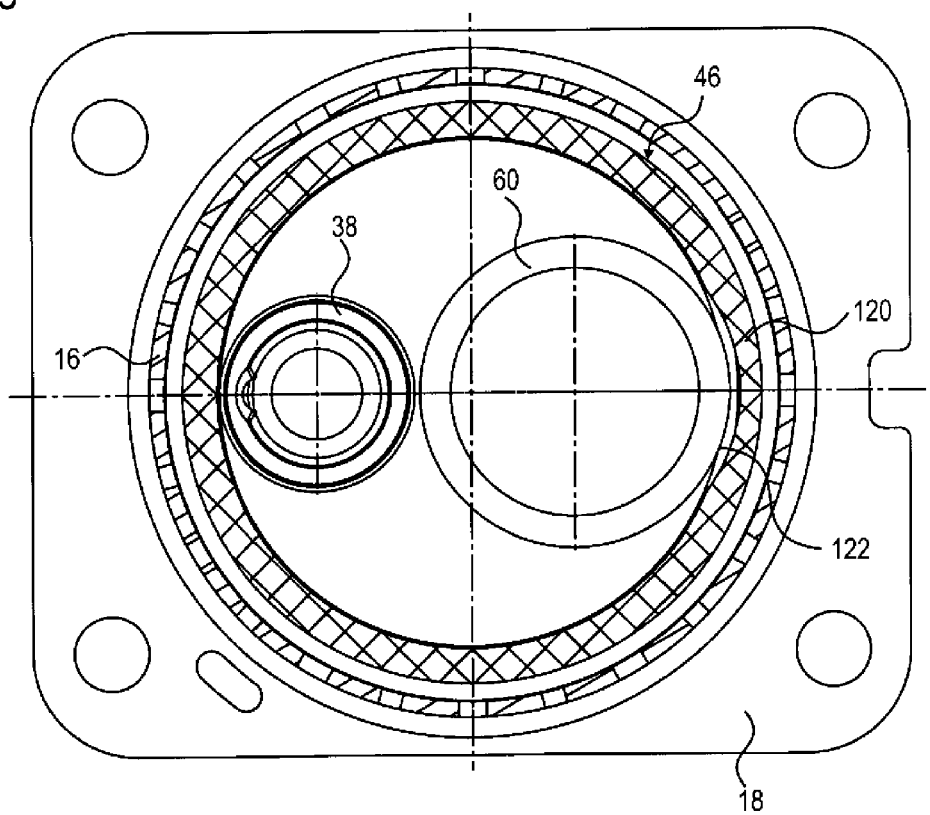

A - A

INFLATOR AND AIRBAG MODULE

RELATED APPLICATIONS

This application is a divisional of U.S. application Ser. No. 13/878,827, filed Sep. 27, 2011, which corresponds to PCT/DE2011/001820, filed Sep. 27, 2011, and which claims the benefit of German Application No. 20 2010 014 288.5, filed Oct. 15, 2010, the subject matter of which are incorporated herein by reference in their entireties.

BACKGROUND OF THE INVENTION

The invention relates to an inflator, especially for a protective device in a vehicle. Furthermore the invention relates to an airbag module for a vehicle.

Inflators for protective devices in a vehicle are especially provided for driving particular members (propping up of hoods, tensioning of the safety belt, shifting of cushions or the like) or for inflating airbags so as to prevent a vehicle occupant from impacting onto hard vehicle parts.

The requirements to the efficiency of an inflator in general are very high. In an extremely short time a particular amount of gas must be made available which shall not be too hot and preferably free of particles. An inflator also should be as light-weight as possible and require little space so that e.g. in the case of mounting in a steering wheel particular requirements of the steering wheel design can be observed.

SUMMARY OF THE INVENTION

The invention creates a compact and effective inflator having a very efficient structure which satisfies the aforementioned requirements.

In accordance with a first major aspect of the invention, the inflator especially provided for a protective device in a vehicle comprises a diffuser which preferably forms a substantially rotation-symmetric external housing of the inflator with a closing member. The diffuser includes more than 12, preferably more than 14, further preferably 23 discharge orifices arranged in a row. The large number of discharge orifices ensures a uniform gas discharge into the airbag. Moreover, the arrangement of the discharge orifices in a row permits an easy tamping at the inside of the diffuses e.g. by a narrow tamping strip.

If a sufficiently large number of discharge orifices in the row are chosen, it is sufficient that the diffuser includes only one single row of discharge orifices.

It is preferred that the inflator is of a kind that has a diffuser which—related to the central axis A of the diffuser (10)—is surrounded by a fixation flange in a ring like manner.

An efficient configuration of the inflator according to the invention provides that the ratio of the outer circumference of the diffuser in mm to the number of the discharge orifices in a row is less than 16.5, preferably less than 14.1, further preferably less than 9.85, further preferably it is between 7.57 and 9.85, further preferably between 8.20 and 8.96 and further preferably it amounts to approx. 8.56.

An especially favorable gas discharge behavior results from the fact that the discharge orifices have at least two, preferably three different cross-sections, wherein the discharge orifices are preferably circular and the different flow cross-sections are defined by different diameters of the circular discharge orifices.

In accordance with an advantageous configuration, opposite discharge orifices have the same flow cross-section—related to a central axis of the diffuser. As a matter of course, this is only applicable to discharge orifices which are in fact opposed to another discharge orifice.

A further advantageous configuration provides that directly neighboring discharge orifices have different flow cross-sections.

In a preferred embodiment of the invention, the discharge orifices have at feast three different flow cross-sections. In the row of the discharge orifices at feast partly a recurring sequence of the following type is provided: first flow cross-section→second flow cross-section→first flow cross-section→third flow cross-section. Preferably the first flow cross-section is small, the second flow cross-section is medium and the third flow cross-section is a large flow cross-section.

Moreover, the preferred embodiment of the invention provides that the ratio of the outer circumference of the diffuser in mm to the number of the discharge orifices having the small flow cross-section is less than 19.7, preferably between 15.1 and 19.7 and further preferably is approx. 17.9.

As regards the other flow cross-sections, the preferred embodiment of the invention provides that the ratio of the outer circumference of the diffuser in mm to the number of the discharge orifices having the medium flow cross-section and/or to the number of the discharge orifices having the large flow cross-section is less than 39.4, preferably ranges between 28.2 and 39.4 and further preferably is approx. 32.8.

As regards the gas discharge, a ratio of the total flow cross-section of all discharge orifices of the row in $mm^2$ to the outer circumference of the diffuser in mm is advantageous which is more than 110, preferably ranges between 110 and 139 and further preferably is approx. 124.

The distances between neighboring discharge orifices in the row are preferably equal.

According to a special arrangement of the discharge orifices, the row of the discharge orifices extends with respect to a central axis of the diffuser in the circumferential direction and has a beginning with a first discharge orifice as well as an end with a last discharge orifice. The distance between the first and the last discharge orifices is larger than, preferably twice as large as the distance between neighboring discharge orifices in the row. Thus one discharge orifice is deliberately "left out".

In this event, the angular distance between neighboring discharge orifices amounts to $360°/(n+1)$, with n being the number of the discharge orifices in the row.

Between the beginning and the end of the row, i.e. in the area in which deliberately no discharge orifice is provided, a joint of a tamping strip can be arranged.

In accordance with a second major aspect of the invention, the inflator comprises a fuel canister filled with fuel having a fuel canister bottom and a fuel canister opening opposed to the fuel canister bottom which is closed by means of a combustion chamber component. The fuel canister constitutes an advantageous filling aid for the fuel which is closed by the combustion chamber component only after filling.

In a preferred embodiment of the invention, the combustion chamber component is a combustion chamber sleeve which preferably at least partially encloses a combustion chamber associated with a particular activating stage of the inflator, wherein the combustion chamber sleeve has a combustion chamber sleeve orifice or an open side and a combustion chamber sleeve bottom opposed thereto which covers the fuel canister opening.

Especially useful is an arrangement of a filling body at the combustion chamber sleeve bottom which is preferably connected to the combustion chamber sleeve bottom, i.e. the combustion chamber sleeve and the fill member constitute a pre-assembled unit. When closing the fuel canister by the combustion chamber sleeve the fill member is automatically disposed in the combustion chamber enclosed by the combustion chamber sleeve. This has the advantage that the filling body need not be separately inserted and a correct positioning is ensured.

A defined arrangement of the combustion chamber sleeve relative to the fuel canister is preferably achieved in that at least a part of a side wall of the fuel canister extending between the fuel canister opening and the fuel canister bottom is directly opposite to a part of a side wall of the combustion chamber sleeve extending between the combustion chamber sleeve orifice or the open side of the combustion chamber sleeve and the combustion chamber sleeve bottom.

According to a particularly advantageous configuration, the fuel canister and the combustion chamber sleeve can form a sleeve plug-in system by designing the fuel canister and the combustion chamber sleeve in the form of two open substantially cylindrical sleeves which are plugged into each other while being oriented opposed to each other so that an inner or outer shell of the fuel canister and an outer or inner shell of the combustion chamber sleeve substantially cover each other over the entire axial length of the shells. The combustion chamber sleeve is preferably slipped onto the outside of the fuel canister. This ensures that the fuel chamber sleeve does not contact the fuel so as to exclude damage of the fuel and/or hindering a slip-on of the combustion chamber sleeve.

In order to reinforce the fuel canister, it may have a bead or fin in the vicinity of the fuel canister opening which is preferably completely circumferential in circumferential direction—related to a central axis of the fuel canister—. Thus undesired deformation when handling the fuel canister can be counteracted.

For attaching the fuel canister in the inflator a central fuel canister bottom opening can be advantageously formed in the fuel canister bottom to receive an igniter carrier.

In order to permit a stable support of the fuel canister the fuel canister bottom opening is formed by a preferably bent inner edge portion of the fuel canister bottom which extends from the fuel canister bottom into the inside of the fuel canister. The edge portion can be supported on a holding surface of the carrier component.

Plural holes are preferably formed in the fuel canister bottom so that the gas formed during combustion of the fuel in the fuel canister can escape from the fuel canister.

On the other hand, the fuel chamber sleeve preferably is free of holes, apart from the combustion chamber sleeve orifice or the open side.

According to a preferred type of mounting, the combustion chamber sleeve is attached to an igniter carrier so that, if it is appropriately designed as a press fit, no further mounting measure is required.

Preferred materials for the fuel canister are aluminum, copper, plastic material or steel; the combustion chamber sleeve is preferably made of steel.

In accordance with a third major aspect of the invention, the inflator comprises a combustion chamber sleeve which at least partly encloses a combustion chamber filled with fuel. The combustion chamber sleeve is designed so that its position and/or shape are varied by a pressure formed during combustion of the fuel such that a discharge orifice is released for a combustion gas formed during combustion of the fuel. The discharge orifice leads out of the combustion chamber, preferably into another combustion chamber of the inflator. Such configuration permits to completely dispense with discharge orifices during manufacture of the combustion chamber sleeve, because the discharge orifice according to the invention is formed as needed. Apart from the less complex manufacture of the combustion chamber sleeve, this has the advantage that no discharge orifices have to be sealed.

Accordingly, it is preferably provided that the combustion chamber sleeve exhibits no discharge orifice prior to the combustion of the fuel.

In a preferred embodiment of the invention the combustion chamber sleeve moves toward a ceiling portion of a diffuser of the inflator due to the pressure formed during combustion of the fuel, wherein the movement is preferably limited by the ceiling portion. Consequently, the pressure prevailing in the combustion chamber is used for a controlled movement of the combustion chamber sleeve.

A further development of this concept provides that the combustion chamber sleeve is partly supported on the ceiling portion of the diffuser, preferably already prior to activation of the inflator, and that the pressure causes tilting and/or non-uniform deformation of the combustion chamber sleeve. The tilting or deformation is deliberately forced so as to create the desired discharge orifice.

According to a preferred design, the combustion chamber sleeve is attached to a support component of the inflator, especially an igniter carrier. The discharge orifice is formed by the fact that the combustion chamber sleeve detaches at least partially from the carrier component so that a gap is formed between the combustion chamber sleeve and the carrier component. The combustion gas can escape from the combustion chamber through the gap.

Of particular advantage is a structure designed such that the gap—related to a central axis of the combustion chamber sleeve—is formed to be not completely circumferential or at least not at a constant width. The gap has its largest width in an area facing away from a filter disposed outside the combustion chamber and/or having the largest possible distance from the filter. Thus the filter can be prevented from being damaged, as the combustion gas impinges on the filter only after overcoming a quite large distance or via a by-pass.

According to the special filling concept of the combustion chamber, the combustion chamber sleeve is slipped onto the fuel canister filled with fuel and having a fuel canister bottom including one or more holes through which the combustion gas flows to the discharge orifice. In this way a flow communication for the combustion gas from the fuel canister to the discharge orifice is ensured by simple means.

When appropriately designing the fuel canister, the hole(s) in the fuel canister bottom can also formed as late as by the pressure developed during combustion of the fuel and tearing of the fuel canister bottom caused thereby.

In accordance with a fourth major aspect of the invention, the inflator comprises an igniter sleeve which at least partially encloses an igniter and an igniter chamber especially filled with a boosting charge and is adjacent to a first combustion chamber filled especially with fuel. The igniter sleeve includes—related to a central axis of the igniter sleeve—overflow orifices which are distributed non-uniformly in circumferential direction. It is the purpose of this measure to direct the hot gas overflowing from the igniter sleeve by which the fuel of the adjacent combustion chamber is ignited to preferred areas of the combustion chamber, which permits optimum ignition of the fuel in the combustion chamber.

In conformity with this concept, a predetermined orientation of the igniter sleeve can be determined such that the overflow orifices are not directed directly to a filter disposed outside the igniter sleeve. In this way, the filter is not exposed to unnecessary load and damage of the filter by the hot gas overflowing from the igniter sleeve, to which particles are added, is prevented.

According to a particular development of this aspect of the invention, the igniter sleeve includes a marker distant from its central axis or extending non-symmetrically from the central axis which indicates the predetermined orientation of the igniter sleeve. The marker assists in avoiding errors in mounting the igniter sleeve as regards the orientation thereof.

Especially a nose or a recess at the igniter sleeve is suited as marker. For mounting a tool carrier can be provided which includes a matching recess or nose and receives the igniter sleeve so that it is automatically mounted in the inflator at the predetermined orientation.

In addition or as an alternative, a configuration of the igniter can be provided which is adapted to the configuration of a neighboring component of the inflator such that an assembly of the igniter sleeve in the inflator is only possible at the predetermined orientation. In this way mounting errors are practically completely excluded.

It may be provided, for instance, in an igniter sleeve offset with respect to the central axis of a diffuser that a bottom of the igniter sleeve opposed to a ceiling portion of the diffuser exhibits a slant adapted to a curvature of the ceiling portion of the diffuser in such fashion that the igniter sleeve fits below the ceiling portion of the diffuser only at the predetermined orientation.

The overflow orifices advantageously define at the predetermined orientation of the igniter sleeve in circumferential direction a maximum angular area extending to both sides of a connecting line between the central axis of the igniter sleeve and the portion of the filter maximally distant from the central axis. This is to save the filter at best.

A design of the overflow orifices according to which the angular range includes areas which have a maximum distance from the filter not blocked by components of the inflator permits an optimum "yield" of the igniting jets emitting from the overflow orifices in accordance with a maximum effective length. The fuel in the combustion chamber cannot be understood as component of the inflator in this context; on the contrary: as much fuel as possible is to be covered by the igniting jets of the burning booster charge between the igniter sleeve and the filter.

The angular area can also include a combustion chamber component, especially a combustion chamber sleeve, which surrounds a second combustion chamber which itself in turn is at least partly surrounded by the first combustion chamber.

In a preferred embodiment the angular range is obtuse and preferably is between 90° and 135°, further preferably between 100° and 120° and further preferably amounts to approx. 110°.

With respect to optimizing the combustion chamber surrounding the igniter sleeve, it is advantageous to design the igniter sleeve so that it is radially tapered in axial direction toward a bottom of the igniter sleeve. In this case, due to the tapering outside the igniter sleeve more space is provided for the fuel, In accordance with a fifth major aspect of the invention, the inflator comprises an igniter sleeve which at least partially encloses an igniter and an igniter chamber especially filled with a booster charge and is adjacent to a first combustion chamber associated with a first activating step of the inflator. The inflator further comprises a combustion chamber sleeve which at least partially encloses a second combustion chamber filled with fuel and associated with a second activating step of the inflator. Both sleeves are juxtaposed and are preferably differently offset with respect to a central axis of the inflator. This arrangement results in an extremely compact and efficient structure of a two-stage inflator.

Especially efficient is a configuration in which the distance between the central axes of the igniter sleeve and the combustion chamber sleeve is between 22.5 and 27.5 mm, preferably between 23.5 and 26.5 mm and further preferably amounts to approx. 25 mm.

The ratio of the minimum inner diameter of the combustion chamber sleeve to the minimum inner diameter of the igniter sleeve of preference is between 1.64 and 2.63, preferably between 1.83 and 2.32. Further preferably this ratio amounts to approx. 2.06.

On the one hand, an optimum adjustment between the compact structure of the two-stage generator and an efficient cooling and filtering of the generated gas results from an at least partial radial restriction of the first combustion chamber by an at least partly circumferential filter—related to a central axis of the inflator—, wherein the ratio of the inner diameter of the filter to the minimum inner diameter of the igniter sleeve is between 3.19 and 4.76, preferably between 3.50 and 4.27 and further preferably amounts to approx. 3.85.

On the other hand, in the case of such filter configuration an optimum adjustment is reached with a ratio of the inner diameter of the filter to the minimum inner diameter of the combustion chamber sleeve which is between 1.66 and 2.11, preferably between 1.76 and 1.99 and further preferably amounts to approx. 1.87.

According to on efficient configuration of the inflator according to the invention, the ratio of the outer diameter of the inflator to the minimum inner diameter of the igniter sleeve is between 4.09 and 5.98, preferably between 4.46 and 5.39, and further preferably amounts to about 4.89. By the outer diameter of the inflator the outer diameter of the outermost inflator component has to be understood, for instance of a diffuser, wherein a laterally (radially) extending flange is not taken into consideration.

According to another efficient configuration, the ratio of the outer diameter of the inflator to the minimum inner diameter of the combustion chamber sleeve is between 2.13 and 2.66, preferably between 2.24 and 2.50 and further preferably amounts to approx. 2.38.

A special design provides that the axial distance of an open side of the igniter sleeve from a bottom of a closing member of the inflator is unequal to the axial distance of an open side of the combustion chamber sleeve from the bottom of the closing member, the distance of the igniter sleeve preferably being larger. Since the igniter sleeve and the combustion chamber sleeve have different diameters, thereby the use of carrier components having a substantially equal structure is made possible for both sleeves which can be mounted at the same height in the closing member bottom and both have a first receiving portion adapted to the igniter sleeve as well as a second receiving portion axially offset to the former and adapted to the combustion chamber sleeve.

As regards the particular mechanism of the second activating stage in which the discharge orifice leading out of the combustion chamber sleeve is formed as late as by a pressurized raising of the combustion chamber sleeve, a support of the igniter sleeve and the combustion chamber sleeve is advantageous in which the igniter sleeve and the combustion chamber sleeve are attached onto a first igniter carrier and a second igniter carrier, the axial height of the contact area between the igniter sleeve and the first igniter carrier being larger than the axial height of the contact area between the combustion chamber sleeve and the second igniter carrier. The combustion chamber sleeve detaches from the second igniter carrier already after a slight axial displacement and thus releases the desired discharge orifice. Although in the igniter sleeve also an axial displacement can occur, a release of an (additional) discharge orifice is not provided, however.

Accordingly, a preferred embodiment of the inflator according to the invention is designed such that both the igniter sleeve is raised by the pressure formed during combustion of the booster charge and the combustion chamber sleeve is raised by the pressure formed during combustion of the fuel, preferably in the direction of the ceiling portion of a diffuser of the inflator. By raising the combustion chamber sleeve a discharge orifice is released, preferably in the form of a discharge gap which leads out of the combustion chamber sleeve, whereas no discharge orifice is released by raising the igniter sleeve. The later is not desired, because in the igniter sleeve already advantageously positioned overflow orifices are provided which are released during combustion of the boosting charge at the latest.

Preferably the diffuser is designed so that a ceiling portion limits the movement of the igniter sleeve and the movement of the combustion chamber sleeve.

In accordance with a sixth major aspect of the invention, the inflator comprises a filter and a combustion chamber component at least partially enclosing a combustion chamber, in particular in a ring shaped manner, especially of a combustion chamber sleeve. The filter exhibits a critical filter portion which is closer to the combustion chamber component than the other filter areas situated along its ring shaped extension. The critical filter portion has a reduced thickness compared to areas of the filter that are adjacent to the critical filter portion. Especially between the combustion chamber component and the critical filter portion a gap is formed. This measure constitutes a protection against over-igniting, it has to be ensured that the fuel of the second activating stage is not automatically (thermally) ignited during and possibly after combustion of the fuel of the first activating stage. Heat introduction to the fuel of the second activating stage by burning the fuel of the first activating stage is not absolutely critical in this context. However, heating of the liter and especially the heat radiation reflection (having a delaying effect) of the heated filter could have negative effects, especially in the area close to the combustion chamber of the second activating stage. The tapering of the critical filter portion therefore creates a heat-insulating distance (air gap) between the filter and the combustion chamber component for reasons of precaution.

Preferably the material forming the filter is compressed more highly in the critical filter portion than in the adjacent areas. The critical filter portion in this case can be manufactured simply by a spatially limited compression of the filter without material having to be abraded.

For further improvement, the combustion chamber component can have an increased material thickness at least in the area opposed to the critical filter portion. Optimum protection against over-igniting is resulting from the combination of the material thickening of the combustion chamber component with the opposed filter tapering.

According to a preferred arrangement the filter extends along a circumferential wall of the inflator surrounding a chamber of the inflator in which the combustion chamber component is arranged.

In the case of a combustion chamber component which extends over a larger axial height than the filter, it is sufficient when the combustion chamber component has an increased material thickness substantially only in the axial area into which also the filter extends. Thus material expenses and weight can be saved.

According to an efficient configuration, the ratio of the minimum thickness of the critical filter portion to the thickness of the adjacent areas of the filter is between 0.43 and 0.93, preferably between 0.53 and 0.78, and further preferably amounts to approx. 0.65.

According to a further efficient configuration of the protection against over-igniting, the ratio of the minimum thickness of the critical filter portion to the maximum width of the gap is between 1.17 and 2.85, preferably between 1.50 and 2.23, and further preferably amounts to approx. 1.83.

A special design and arrangement of the filter provides that the inflator is closed at a first axial end face by a diffuser having a substantially axially extending circumferential wall, the filter extending in axial direction beyond the circumferential wall.

In accordance with a seventh major aspect of the invention, the inflator comprises a circumferential wall which especially surrounds a combustion chamber and a filter which extends at least partly along the wall. The wall includes at least one supporting portion. The supporting portion constitutes an axial support for the filter and is formed preferably integrally with the wall. It is an advantage of this wall support for the filter that inside the inflator the filter need not extend unnecessarily over the entire height, in this way filter material can be saved and more space is available for fuel in the combustion chamber only partially surrounded by the filter in that case. An otherwise required separate supporting element can be dispensed with.

Either only one supporting portion formed by a completely circumferential preferably embossed bead can be provided or else plural supporting portions can be formed by preferably embossed beads. According to the latter alternative the beads can be spaced apart from each other in circumferential direction.

According to a preferred embodiment, the inflator is closed at an axial end face by a closing member and the supporting portion(s) is/are formed in a pulled-up edge of the closing member.

An advantageous configuration provides that the filter is supported only with a radially outer area on the supposing portion or portions. In the case of an embossed bead, the same thus need not extend inwardly over the entire thickness of the annular filter.

In accordance with an eighth major aspect of the invention, the inflator comprises a first combustion chamber filled with fuel which is associated with a first activating stage of the inflator and is closed at one side by a cover, especially a diffuser. Between the fuel and the cover a first fill member is disposed. The first fill member has at least one, preferably circular, recess. A sleeve, especially an igniter sleeve associated with the first activating stage of the inflator, or a combustion chamber sleeve associated with a second activating stage of the inflator projects into the recess. A fill member of this design has plural advantages, apart from fulfilling its main purpose, it supports the stability of the sleeve protruding into the recess as regards undesired shifting or tilting in lateral direction. Moreover, the special configuration of the fill member allows an extremely compact shape in axial direction, as the sleeve protrudes into the fill member so that the space between the sleeve and the cover can be minimized.

Especially in a two-stage inflator according to a preferred embodiment the first fill member has two recesses of different size, wherein preferably the igniter sleeve protrudes into the smaller recess and the combustion chamber sleeve preferably protrudes into the larger recess.

An efficient configuration provides that the ratio of the diameter of the larger recess to the diameter of the smaller recess is between 1.52 and 2.25, preferably between 1.67 and 2.03 and further preferably amounts to approx. 1.84.

The manufacture of the first fill member can be simplified by designing the first fill member at least in two parts. It is another advantage of the two-part design that during mounting the fill member larger tolerances can be compensated than with a one-part design of the fill member.

In this case, a design in which each of the two parts of the first fill member has the shape of a double half moon is especially expedient. The fill members then can have identical shapes and can be arranged symmetrically with respect to each other.

The preferred material for the fill member is silicone which, on the one hand, is resilient to keep the fuel under pressure so as to avoid noise. On the other hand, the silicone does not react, when the inflator is activated, with the fuel or with components of the inflator in an undesired manner.

In accordance with a ninth major aspect of the invention, the inflator comprises a radially projecting generator flange—related to a central axis of the inflator—for mounting the inflator to a generator carrier. The generator flange substantially has a rectangular shape. The rectangular configuration of the generator flange permits a space-saving design of the generator carrier and of the construction space surrounding the inflator, especially when the flange is only slightly wider than the outer diameter of the external housing of the inflator. By a substantially rectangular shape one does not necessarily understand a perfect rectangle; basically rectangular shapes having rounded corners, edge-side recesses etc. are also to be comprised.

It is provided in a preferred design that the inflator includes an external housing having a preferably circular cross-section whose central axis extends across the center of the generator flange.

Regarding the dimensions of the generator flange, for attaching the inflator to the generator carrier a length-to-width ratio of the rectangle between 1.12 and 1.31, preferably between 1.16 and 1.27 has turned out to be advantageous. Further preferably this ratio amounts to approx. 1.21.

Equally preferred is a ratio of the length of the rectangle to the outer diameter of the external housing ranging between 1.24 and 1.48, preferably between 1.30 and 1.42 and further preferably amounting to approx. 1.38.

Concerning the width of the generator flange, a ratio of the width of the rectangle to the outer diameter of the external housing is preferred which ranges between 1.01 and 1.23, preferably between 1.06 and 1.17 and further preferably amounts to approx. 1.12.

In accordance with a tenth major aspect of the invention, the inflator comprises an igniter unit having a marker. The marker facilitates mounting of the igniter unit in which the latter has a predetermined orientation. This is advantageous especially against the background that the electric connecting pins of the igniter have to be mounted orientated in the inflator in order to later ensure a correct plugging of the counter plug in the interface/cavity of the igniter carrier of the igniter unit. The tool which during assembly of the inflator supplies the pre-mounted igniter unit in an orientated fashion to the inflator component into which the igniter unit is inserted need not "enter" the sensitive interface of the igniter carrier to this end. Thus the sensitive connecting pins of the igniter are not exposed to unnecessary tool contact.

Especially a milled slot offers itself as marker.

Simplified handling results from the fact that the igniter unit is a pre-assembled unit having an igniter carrier and an igniter contained therein which is preferably adapted to be inserted in a bottom orifice of a closing member of the inflator.

In accordance with an eleventh major aspect of the invention, the inflator comprises a diffuser which forms a preferably substantially rotation-symmetric external housing of the inflator with a closing member, wherein the wail thickness of the closing member is larger at least in portions than that of the diffuser. This aspect is based on the finding that a greater wall thickness of the closing member is of advantage for receiving one or more igniter units, whereas a comparatively smaller wall thickness of the diffuser permits a desired bulging of the diffuser in the case of activation.

Accordingly, it is provided in a preferred design that the closing member has a substantially plane bottom in which at least one orifice is formed for receiving the igniter carrier. At least the bottom has a greater wail thickness than the diffuser.

In accordance with a twelfth major aspect of the invention, the inflator comprises a combustion chamber component at least partially enclosing a combustion chamber, especially a combustion chamber sleeve, and a diffuser having a ceiling portion. The axial distance between the combustion chamber component and the ceiling portion varies related to a central axis of the diffuser. With a symmetric curvature of the ceiling portion and a perpendicular arrangement with respect to the central axis of the portion of the combustion chamber component opposed to the ceiling portion, this corresponds to an arrangement of the combustion chamber component offset with respect to the central axis.

Of preference, the combustion chamber component contacts the ceiling portion of the diffuser in a non-activated state of the inflator at least at one position. Due to the distance between the combustion chamber component and the ceiling portion provided at the other positions, the combustion chamber component (combustion chamber sleeve) can be tilted as it is provided according to the special functioning of the second activating stage of the inflator.

The tilting is promoted by a configuration showing the largest axial distance between the combustion chamber component and the ceiling portion of the diffuser at the central axis of the diffuser which preferably continuously decreases with an increasing radial distance from the central axis.

According to a preferred embodiment, the maximum distance between the combustion chamber component and the ceiling portion of the diffuser ranges between 2.3 and 3.7 mm, preferably between 2.7 and 3.3 mm, and further preferably amounts to approx. 3.0 mm.

Likewise an igniter sleeve offset with respect to the central axis of the diffuser can be provided whose axial distance from the ceiling portion of the diffuser varies in a similar way, especially by the fact that the axial distance of the igniter sleeve from the ceiling portion of the diffuser preferably continuously decreases with an increasing radial distance from the central axis of the diffuser.

According to a preferred embodiment, the maximum distance between the igniter sleeve and the ceiling portion of the diffuser is between 2.1 and 3.5 mm, preferably between 2.5 and 3.1 mm, and further preferably amounts to approx. 2.8 mm.

In accordance with a thirteenth major aspect of the invention, the inflator comprises a first combustion chamber associated with a first activating stage of the inflator and a second combustion chamber associated with a second activating stage of the inflator. The second combustion chamber is surrounded at least partially by the first combustion chamber and has a smaller volume than the first combustion chamber. This arrangement and dimensioning of the combustion chambers permits a structure of a two-stage inflator that is extremely compact also in the radial direction.

An efficient configuration provides that the ratio of the volume of the first combustion chamber to the volume of the second combustion chamber is between 2.07 and 3.78, preferably between 2.41 and 3.21, and further preferably amounts to approx. 2.82.

Another efficient configuration provides that the ratio of the volume of the first combustion chamber to the volume of an igniter sleeve at least partially surrounded by the first combustion chamber is between 9.0 and 35.0, preferably between 11.6 and 22.0, and further preferably amounts to approx. 15.5.

The above-mentioned ratios are advantageous especially in an inflator design in which the ratio of the outer diameter of an external housing of the inflator to the height of the external housing is between 1.38 and 1.78 and further preferably amounts to approx. 1.57.

Such inflator whose construction height, especially the axial height of an external housing of the inflator, ranges between 30 and 50 mm and preferably amounts to approx. 40 mm, is particularly suited for a driver airbag module in a vehicle comprising an airbag having a volume of 40 to 60 liters.

Another efficient configuration provides that the ratio of the volume of the first combustion chamber to the volume of the second combustion chamber is between 2.34 and 3.27, preferably between 2.54 and 3.00, and further preferably amounts to approx. 2.76.

Another efficient configuration provides that the ratio of the volume of the first combustion chamber to the volume of an igniter sleeve at least partially surrounded by the first combustion chamber is between 13.5 and 31.0, preferably between 16.0 and 24.0, and further preferably amounts to approx. 19.3.

The last stated ratios are advantageous especially with an inflator design in which the ratio of the outer diameter of an external housing of the inflator to the height of the external housing is between 0.94 and 1.16 and further preferably amounts to approx. 1.05.

Such inflator whose construction height especially the axial height of an external housing of the inflator, ranges between 50 and 70 mm and preferably amounts to approx. 60 mm, is particularly suited for a passenger airbag module in a vehicle comprising an airbag which has a volume of 60 to 135 liters.

In general, very large airbags can be inflated by the extremely compact "disk-shape" inflator according to the invention.

BRIEF DESCRIPTION OF THE DRAWINGS

Further features and advantages of the invention are resulting from the following description and from the attached drawings that are referred to, in which:

FIG. 6 is a lateral sectional view of an igniter carrier of an inflator according to the invention.

FIG. 7 illustrates the igniter carrier of FIG. 6 including an inserted packing ring.

FIG. 8 illustrates the igniter carrier of FIG. 7 including an inserted igniter.

FIG. 9 illustrates the igniter carrier and the igniter of FIG. 9 in the pre-assembled state.

FIG. 13 is a perspective view of an igniter sleeve of an inflator according to the invention according to a first embodiment.

FIG. 14 is a lateral sectional view of the igniter sleeve of FIG. 13.

FIG. 15 is a sectional view along the line of cut A-A of FIG. 14.

FIG. 16 is a lateral sectional view of an igniter sleeve according to a second embodiment.

FIG. 27 is a top view of an inflator according to the invention partly cut in a lower area of the inflator.

FIG. 28 is a partly cut perspective view of an inflator according to the invention without diffuser.

FIG. 32 is a top view of a fill member part for the first combustion chamber of an inflator according to the invention in accordance with an embodiment.

FIG. 33 is a perspective view of the fill member part of FIG. 32.

FIG. 34 is a top view of an inflator according to the invention cut in an upper area of the inflator.

DESCRIPTION

In the following detailed description of preferred embodiments and variants of the invention indications such as at the top, bottom etc. are used for a better comprehension. These indications relate to an orientation of the inflator as shown in the FIGS. 1 and 2.

It is understood that individual features or groups of features described in connection with a configuration and/or an embodiment may also be the subject matter or element of any other configuration and/or embodiment, even if this is not expressly mentioned once again hereinafter. Each of the described sleeve variants or individual features of the same can be provided in any of the configurations, for instance. Also, the filter/diffuser designs, designs of discharge orifices and the other features can be combined at will.

Figure 1:
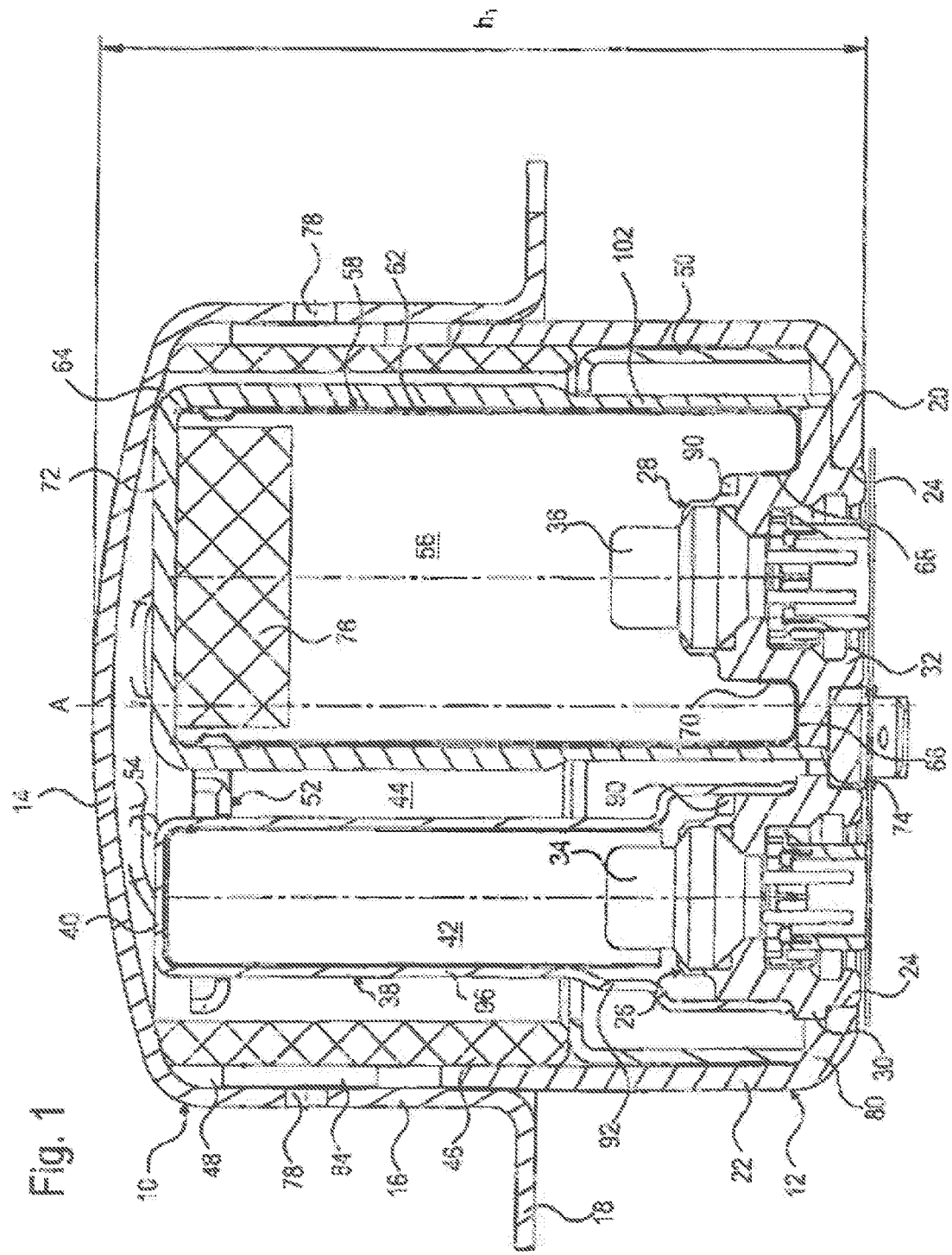
FIG. 1 is a sectional side view of an inflator according to the invention of a first configuration.

In FIG. 1 an inflator which is part of an airbag module having an inflatable airbag is shown according to a first configuration. The inflator comprises an external housing which is composed of a cup-shaped diffuser 10 and a closing member 12.

The diffuser 10 includes a curved ceiling portion 14 and a substantially cylindrical circumferential wall 16 connected thereto. A generator flange 18 extends radially outwardly from the side of the circumferential wall 16 facing away from the ceiling portion 14. Hereinafter the generator flange 18 shall not be considered to be part of the external housing.

The closing member 12 has a substantially plane bottom 20 and an outer circumferential pulled up edge 22 which is adjacent to the inside of the circumferential wall 16 of the diffuser 10. The wall thickness of the closing member 12 is larger at least in portions than that of the diffuser 10. Especially the bottom 20 of the closing member 12 is thicker than the circumferential wall 16 and the ceiling portion 14 of the diffuser 10.

The external housing formed of the diffuser 10 (without generator flange 18) and the closing member 12 is substantially rotation-symmetric with respect to the central axis A of the inflator, as it is usual for so called "disk-shape" inflators which also include the subject matter of the invention. The central axis A of the inflator thus coincides with the central axis of the diffuser 10 and the closing member 12.

The closing member 12 includes two bottom orifices 24 differently spaced apart from the central axis A of the inflator which serve for receiving pre-assembled igniter units 28, 28. Both igniter units 26, 28 comprise a respective igniter carrier 30 and 32 and a respective igniter 34 and 36 inserted in the former.

The first igniter unit 20 (left in FIG. 1) is associated with a first activating stage of the inflator. An igniter sleeve 38 open at one side whose bottom 40 is opposed to the ceiling portion 14 of the diffuser 10 is attached to a receiving portion of the first igniter carrier 30. Between the igniter sleeve 38 end the first igniter carrier 30 a press fit is provided so that no further fastening measure (welding etc.) is necessary. The igniter sleeve 33 encloses an igniter chamber 42 into which the first igniter 34 projects. The igniter chamber 42 is filled with a booster charge (not shown), especially in the form of tablets.

The igniter sleeve 38 is completely surrounded by a first combustion chamber 44 which is filled with a fuel (not shown), especially in the form of tablets. As can be recognized from FIG. 1, the diameter of the igniter sleeve 38 is tapered step by step towards its bottom 40. The tapering leaves more space for fuel in the first combustion chamber 44 compared to an igniter sleeve having a constant diameter.

The first combustion chamber 44 is axially confined by the calling portion 14 of the diffuser 10 and the bottom 20 of the closing member 12. Radially the first combustion chamber 44 is confined by a completely circumferential annular filter 46 which extends along the inner side of the pulled up edge 22 of the closing member 12 or along the inner side of the circumferential wall 16 of the diffuser 10, with an annular gap 48 being formed between the filter 46 and the circumferential wall 16.

Below the filter 46 the first combustion chamber 44 is confined in radial direction by a supporting element 50 on which the filter 46 is axially supported, in the case of a not completely circumferential supporting element 50, the first combustion chamber 44 is confined in the areas lying there between by the edge 22 of the closing member 12. The fact that the filter 46 does not extend to the bottom 20 of the closing member 12 allows saving costs for additional filter material and weight.

Between the fuel of the first combustion chamber 44 and the ceiling portion 14 of the diffuser 10 a first fill member 52 is arranged. According to the first embodiment illustrated in FIG. 1, the first fill member 52 is made of expanded metal (knitted mesh) and includes elastic finger-type portions 54 supported toward the ceiling portion 14 of the diffuser 10.

The second igniter 36 (on the right in FIG. 1) protrudes into a second combustion chamber 56 which is surrounded at least partially by the first combustion chamber 44. The second combustion chamber 56 is substantially confined by a fuel canister 58 made of aluminum, copper, plastic material or steel and a combustion chamber sleeve 60 made of steel surrounding the fuel canister 58.

The fuel canister 58 has a substantially cylindrical side wall 62. On an axial end face facing the ceiling portion 14 of the diffuser 10 the fuel canister 58 includes a fuel canister opening 64; in the shown embodiment said end face is completely open. At the opposite end face the fuel canister 53 includes a fuel canister bottom 66 having a central fuel canister bottom opening 68. The fuel canister bottom opening 68 is formed by a bent inner edge portion 70 extending from the fuel canister bottom 66 into the interior of the fuel canister 68. The fuel canister bottom 66 having the bent inner edge portion 70 is supported on an upper receiving portion of the second igniter carrier 32. A press fit is provided between the fuel canister 58 and the second igniter carrier 32 so that no further fastening measure (welding etc.) is required.

The fuel chamber sleeve 60 is pushed onto the fuel canister 58 in opposite orientation so that a fuel chamber sleeve bottom 72 opposed to the ceiling portion 14 of the diffuser 10 completely closes the open side of the fuel canister 58. The free edge 74 at the open side of the combustion chamber sleeve 60 is attached to a lower receiving portion of the second igniter carrier 32. A press fit is provided between the combustion chamber sleeve 60 and the second igniter carrier 32 so that no further fastening measure (welding etc.) is required.

At the combustion chamber sleeve bottom 72 a second fill member 76 tightly connected to the same is arranged that protrudes into the fuel canister 58. Otherwise the second combustion chamber 56 is filled with fuel (not shown), especially in the form of tablets.

Hereinafter the basic functioning of the inflator is described. Special features of the functioning shall further below be explained in detail.

As mentioned already, the inflator is designed in two stages. Upon activation of the first stage the first igniter 34 ignites the booster charge in the igniter chamber 42. During combustion of the booster charge "igniting jets" (hot gas) escape from overflow orifices of the igniter sleeve 38 (not visible in FIG. 1), which will be discussed in detail later, into the first combustion chamber 44 and ignite the fuel provided there. The gas formed during combustion flows through the filter 46 cooling the gas and freeing it from particles and subsequently through discharge orifices 78 of the diffuser 10 which will equally be discussed in detail later into the airbag.

Upon activation of the second stage which, in response to the recognized situation of accident and the activation control, can basically take place after, before or independently of the first stage, the second igniter 36 ignites the fuel in the second combustion chamber 56. The gas formed during combustion of the fuel can escape from the second combustion chamber 56 into the first combustion chamber 44 by a special mechanism which will be described in detail later. From there the gas flows through the filter 46 and the discharge orifices 78 into the airbag.

The structure of the inflator shown in FIG. 1 (first "high" configuration) permits inflating an airbag having a volume of 60 to 135 liters and thus is suited especially for passenger airbag modules.

The construction height of the inflator, especially the axial height h1 of the external housing, in the first configuration ranges between 50 and 76 mm and in the shown embodiment according to FIG. 1 is approx. 60 mm.

In the first configuration of the inflator the ratio of the volume of the first combustion chamber 44 to the volume of the second combustion chamber 56 ranges between 2.34 and 3.27, preferably between 2.54 and 3.00. In the shown embodiment according to FIG. 1 this ratio is approx. 2.76.

In the first configuration of the inflator the ratio of the volume of the first combustion chamber 44 to the volume of the igniter sleeve 38 ranges between 13.5 and 31.0, preferably between 16.0 and 24.0. In the shown embodiment according to FIG. 1 this ratio is approx. 19.3.

In the first configuration of the inflator the ratio of the outer diameter a of the external housing of the inflator (without generator flange 18, cf. FIG. 5) to the height h1 of the external housing is between 0.94 and 1.16 and in the shown embodiment according to FIG. 1 amounts to approx. 1.05.

Figure 2:
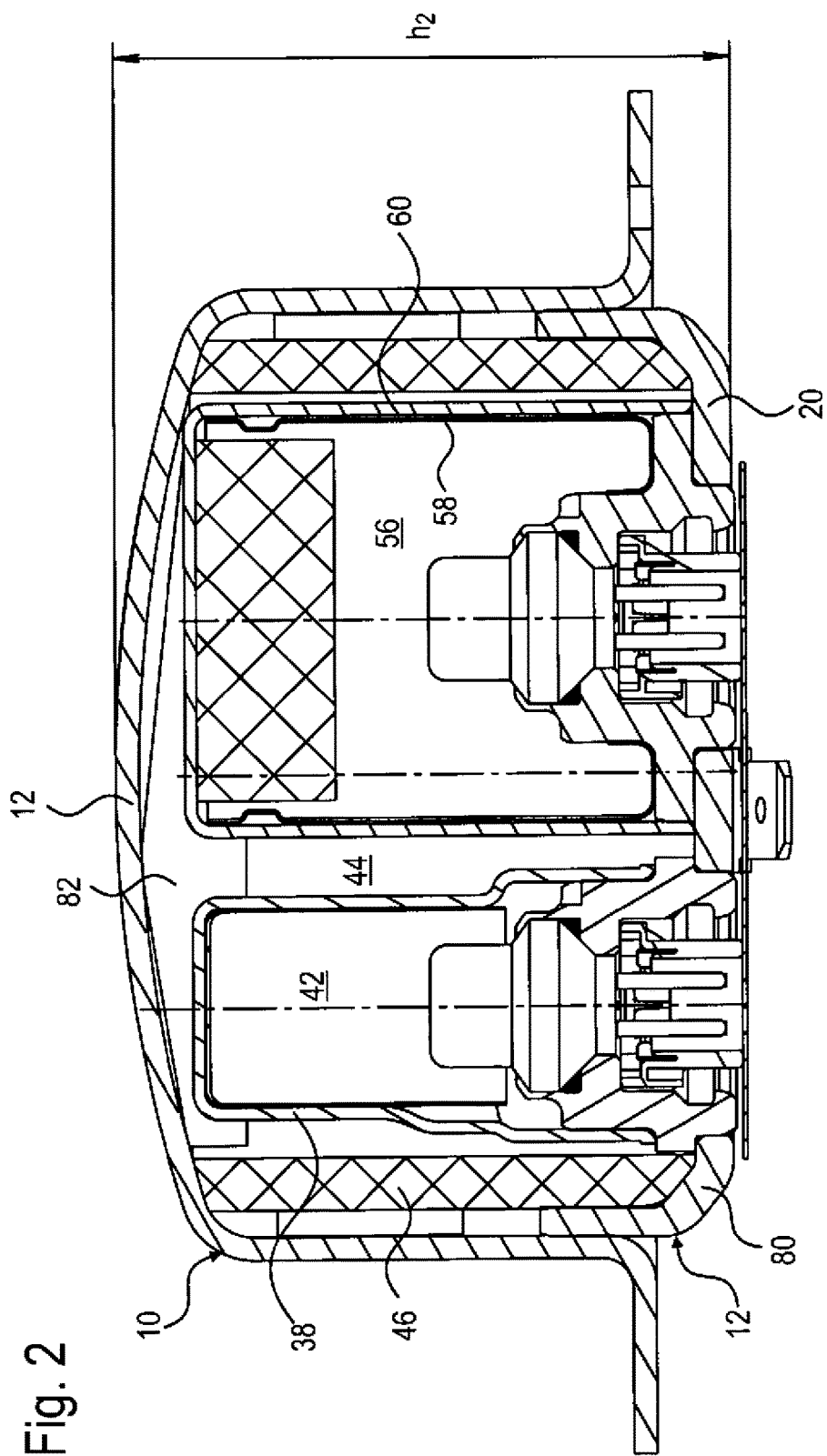
FIG. 2 is a sectional side view of an inflator according to the invention of a second configuration.

FIG. 2 illustrates a second configuration of the inflator having a definitely lower constructional height compared to the first configuration and accordingly is also referred to as "flat" configuration. The structure of the inflator in both configurations is substantially identical with several exceptions. Hereinafter the most important differences will be discussed.

Compared to the first configuration, in the second configuration the axial extensions of the closing member 12, the igniter sleeve 38, the fuel canister 58, the combustion chamber sleeve 66, the igniter chamber 42 and the two combustion chambers 44, 56 reduced.

In the second configuration the filter 46 extends from the ceiling portion 14 of the diffuser 10 to the bottom area of the closing member 12. At its lower end the filter 46 is axially supported on an inclined transition area 80 of the closing member 12, therefore in this case a separate supporting element for the filter 46 as in the first configuration is not provided.

Instead of the first fill member 52 of expanded metal including the elastic finger-type portions 54, according to a second embodiment a flat first fill member 82 of resilient silicone is provided. The embodiment of the first fill member 82 shown in FIG. 2 can also be employed in the first configuration. The second embodiment of the first fill member 82 will be discussed in detail further below.

The structure of the inflator shown in FIG. 2 (second "flat" configuration) permits inflating an airbag having a volume of 40 to 60 liters and is thus especially suited for driver airbag modules.

The construction height of the inflator, especially the axial height h2 of the external housing, in the second configuration ranges between 30 and 50 mm and in the shown embodiment according to FIG. 2 is approx. 40 mm.

In the second configuration of the inflator the ratio of the volume of the first combustion chamber 44 to the volume of the second combustion chamber 56 ranges between 2.07 and 3.78, preferably between 2.41 and 3.21. In the shown embodiment according to FIG. 2 this ratio amounts to approx. 2.82.

In the second configuration of the inflator the ratio of the volume of the first combustion chamber 44 to the volume of the igniter sleeve 38 is between 9.0 and 35.0, preferably between 11.6 and 22.0. In the shown embodiment according to FIG. 2 this ratio is approx. 15.5.

In the second configuration of the inflator the ratio of the outer diameter a of the external housing of the inflator to the height h2 of the external housing is between 1.38 and 1.78 and in the shown embodiment according to FIG. 2 is approx. 1.57.

Hereinafter different peculiarities of the inflator illustrated in FIGS. 1 and 2 are described.

Figure 3:
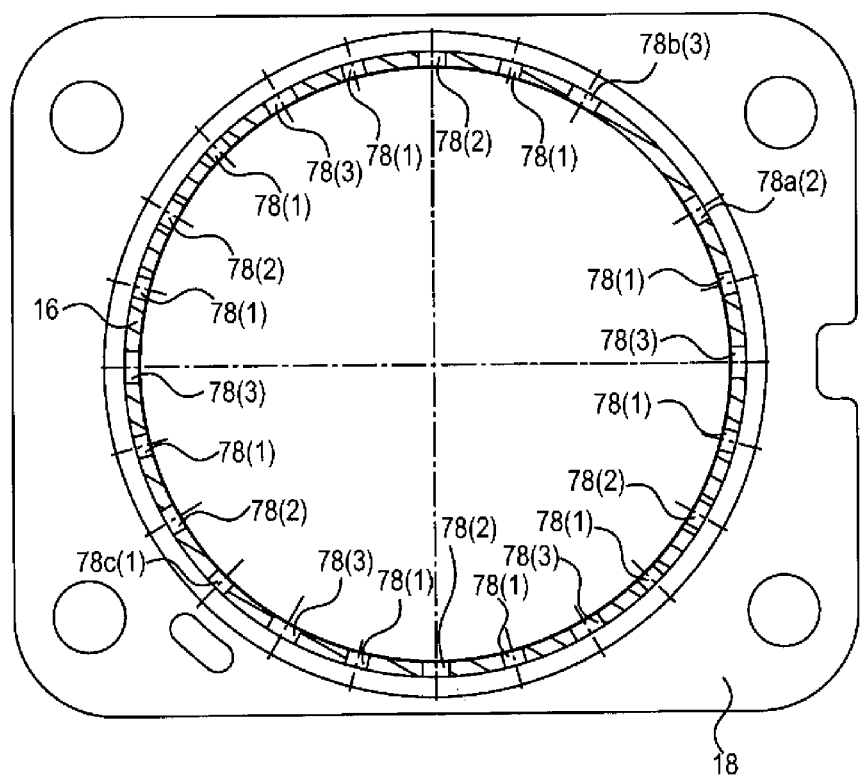
FIG. 3 is a sectional top view of a diffuser of an inflator according to the invention.
Figure 4:
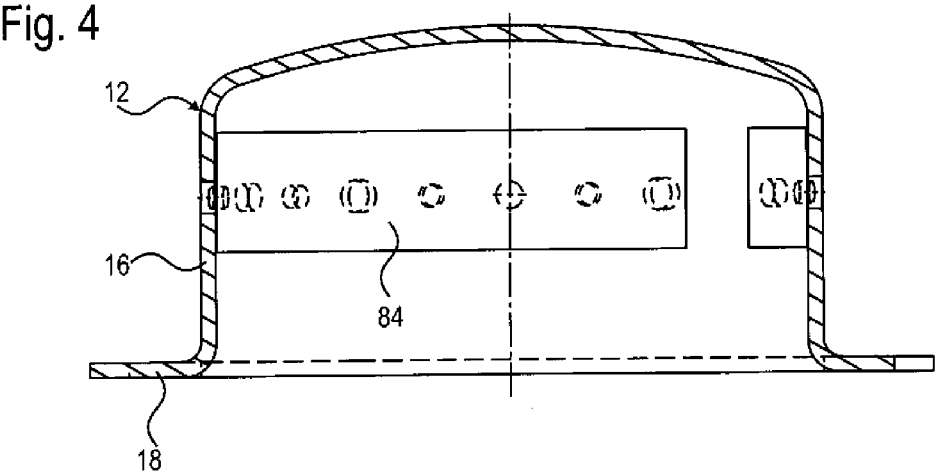
FIG. 4 is a sectional side view of the diffuser of FIG. 3.

The FIGS. 3 and 4 show the diffuser 10 of the inflator which is formed to be substantially rotation-symmetric except for the generator flange 18. In the circumferential wail 16 extending substantially in parallel to the central axis A a plurality of discharge orifices 78 are provided. The discharge orifices 78 era throughout disposed in a row extending at a constant height in circumferential direction. More precisely, all centers of the discharge orifices 78 have the same axial distance from the radially extending generator flange 18.

In the row more than twelve, preferably more than fourteen discharge orifices 78 are provided. In the shown embodiment it is an odd number: exactly twenty-three discharge orifices 78 are arranged in a row. In general, the ratio of the outer circumference of the diffuser 10 in millimeters to the number n of the discharge orifices in the row is less than 16.5, preferably less than 14.1, further preferably less than 9.85. Further preferably the ratio ranges between 7.57 and 9.85, further preferably between 8.20 and 8.96. In the shown embodiment this ratio is approx. 8.56.

As indicated in FIG. 4, at the inside of the diffuser 10 the discharge orifices 78 are covered by a tamping in the form of a circumferential tamping strip 84. The dimensions of the tamping strip 84 are selected such that it fits in the annular gap 48 between the circumferential wall 16 of the diffuser 10 and the circumferential filter 46 (cf. FIGS. 1 and 2).

The row of the discharge orifices 78 is not completely circumferential. Viewed clockwise, the discharge orifice denoted with 78a marks the beginning and the discharge orifice denoted with 78b denotes the end of the row. Within the row the distances between neighboring discharge orifices 78 (related to the centers thereof) are equal. The distance between the first discharge orifice 78a and the last discharge orifice 78b, on the other hand, is twice as large. Since the number n of the discharge orifices 78 in the row is odd, thus the arrangement of the discharge orifices 78 is such that—related to the central axis A—each discharge orifice 78 is opposed to another discharge orifice, with one exception: The discharge orifice denoted with 78c is opposed to the area between the first discharge orifice 78a and the last discharge orifice 78b and thus to no discharge orifice. In this area of the diffuser inside a joint of the tamping strip 84 is disposed. Here a discharge orifice would impair the tightness to the outer area of the inflator.

In general, the angular distance between neighboring discharge orifices 78 in such a constellation (irrespective of whether the number n of the discharge orifices is even or odd) amounts to 360°/(n+1).

The preferably circular discharge orifices 78 have at least two different flow cross-sections; in the shown embodiment there are a total of three different flow cross-sections. The discharge orifices 78 are therefore provided with the addition (1), (2) or (3) in FIG. 3 so as to mark the relevant flow cross-section. The different flow cross-sections (1), (2) and (3) are defined by different diameters of the discharge orifices 78.

The flow cross-sections (1), (2) and (3) of the discharge orifices 78 are selected such that opposite discharge orifices 78 have equal flow cross-sections. On the other hand, neighboring discharge orifices 78 within the row have different flow cross-sections. In the shown embodiment the following sequence of the flow cross-sections is repeated in the row: small flow cross-section (1)→medium flow cross-section (2)→small flow cross-section (1)→large flow cross-section (3).

The ratio of the outer circumference of the diffuser 10 (without generator flange 18) in mm to the number of the discharge orifices 78 having a small flow cross-section (1) is less then 19.7 and preferably is between 15.1 and 19.7. in the shown embodiment this ratio is approx. 17.9.

The ratio of the outer circumference of the diffuser 10 in mm to the number of the discharge orifices 78 having a medium flow cross-section (2) as well as to the number of the discharge orifices 78 having a large cross-section (3) is less than 39.4 and preferably is between 28.2 and 39.4. in the shown embodiment this ratio amounts to approx. 32.8.

The ratio of the total flow cross-section of all discharge orifices 78 in the row in $mm^2$ to the outer circumference of the diffuser 10 in mm is more than 110 and preferably ranges between 110 and 139. In the shown embodiment this ratio is approx. 124.

Figure 5:
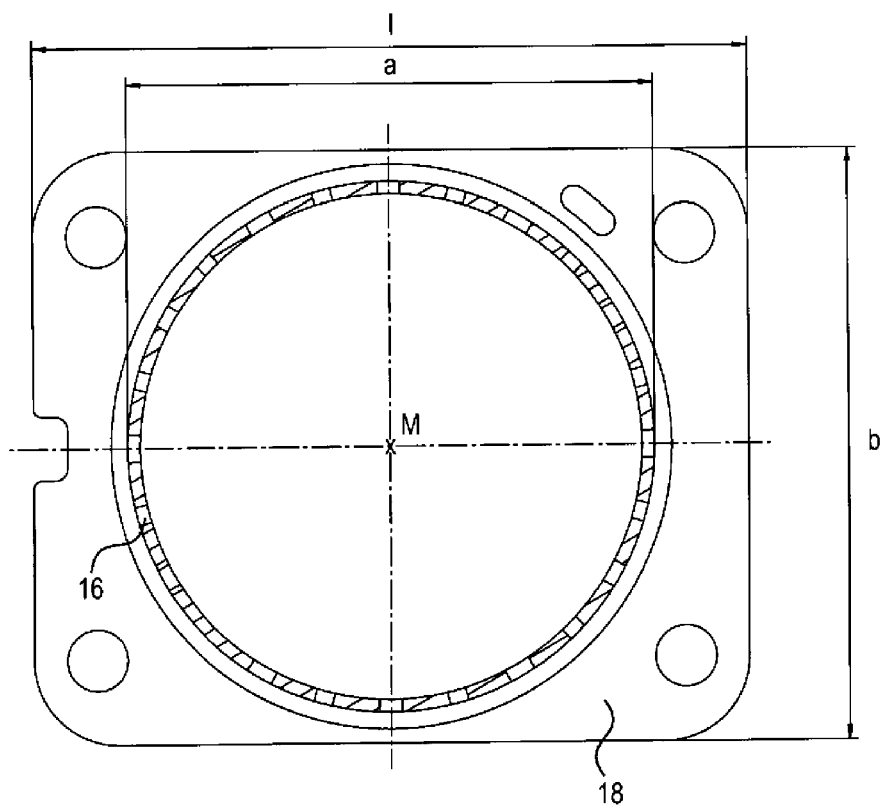
FIG. 5 is a sectional top view of a diffuser of an inflator according to the invention.

It is evident from the top view of the diffuser 10 of the inflator illustrated in FIG. 5 that the generator flange 18 radially outwardly extending from the circumferential wall 16 of the diffuser 10 has a substantially rectangular shape. The central axis A of the rotation-symmetric external housing having circular cross-section extends across the center M of the generator flange 18.

The ratio of the length l to the width b of the rectangle describing the generator flange 18 ranges between 1.12 and 1.31, preferably between 1.16 and 1.27. In the shown embodiment this ratio is approx. 1.21.

The ratio of the length l of the rectangle to the outer diameter a of the external housing (without generator flange 18) is between 1.24 and 1.48, preferably between 1.38 and 1.42. In the shown embodiment this ratio is approx. 1.36.

The ratio of the width b of the rectangle to the outer diameter a of the external housing is between 1.01 and 1.23, preferably between 1.06 and 1.17. In the shown embodiment this ratio is approx. 1.12.

In the FIGS. 6 to 9 different steps of assembling one of the igniter units 26, 28 are illustrated, before the latter is inserted as a pre-assembled unit into one of the bottom orifices 24 of the closing member 12. First, in the igniter carder 30 or 32 shown in FIG. 6 a packing ring 86 is inserted in an igniter seat (cf. FIG. 7), before the igniter 34 or 36 is inserted in the igniter seat of the igniter carrier 30 or 32 (cf. FIG. 8). After that, the projecting circumferential edge 88 of the igniter seat is beaded such that the igniter 34 or 36 is safely held in the igniter carrier 30 or 32 (cf. FIG. 9).

Figure 11:
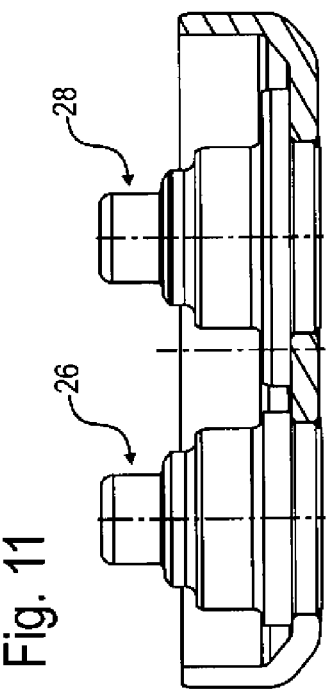
FIG. 11 illustrates the closing member of FIG. 10 including inserted igniter units.
Figure 12:
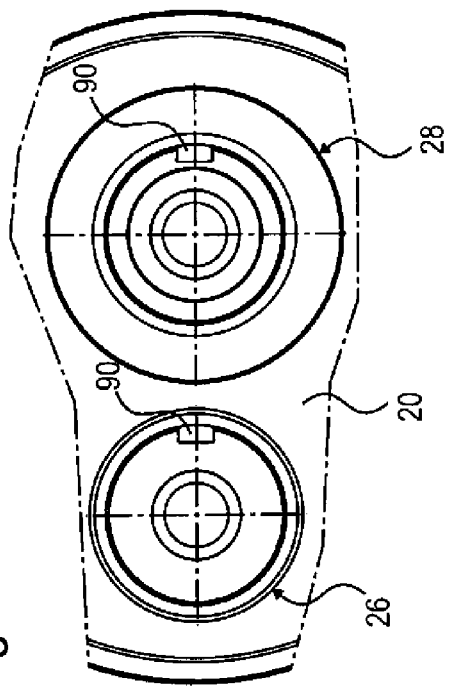
FIG. 12 is a partial top view of the closing member and the igniter units of FIG. 11.
Figure 10:
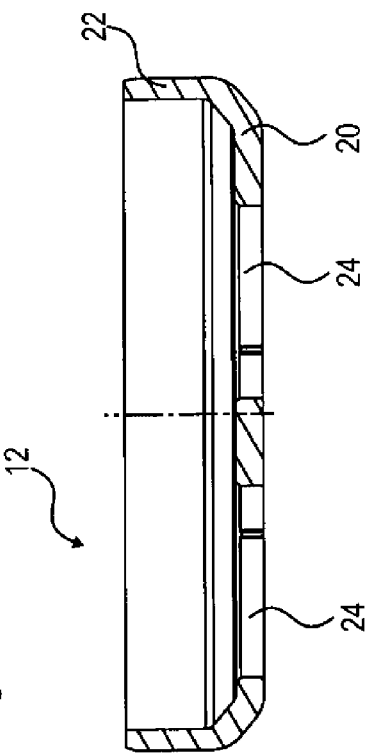
FIG. 10 is a lateral sectional view of a closing member of an inflator according to the invention.
Figure 18:
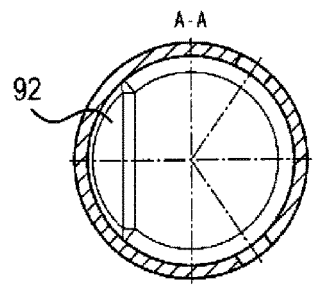
FIG. 18 is a sectional view along the line of cut A-A of FIG. 17.
Figure 17:
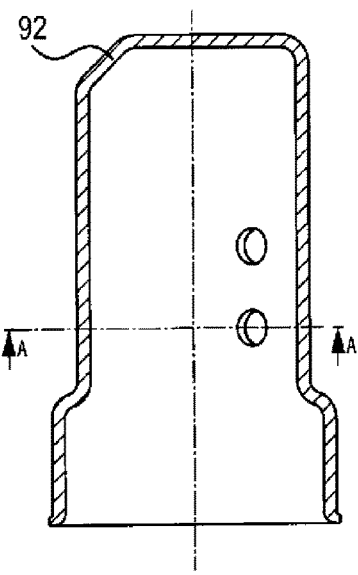
FIG. 17 is a lateral sectional view of an igniter sleeve according to a third embodiment.
Figure 21:
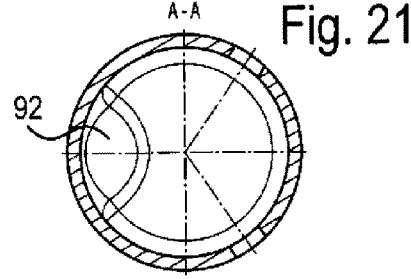
FIG. 21 is a sectional view along the line of cut A-A of FIG. 20.
Figure 22:
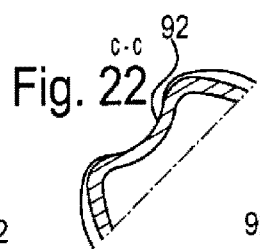
FIG. 22 is a sectional view along the line of cut C-C of FIG. 20.
Figure 19:
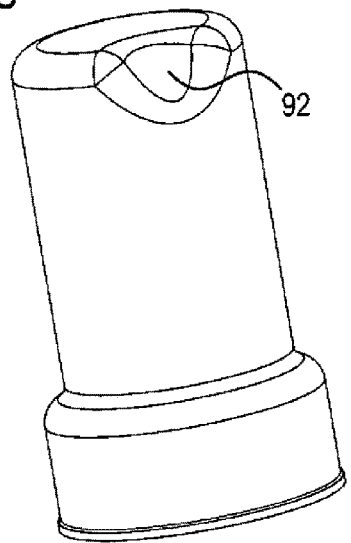
FIG. 19 is a perspective view of an igniter sleeve according to a fourth embodiment.
Figure 20:
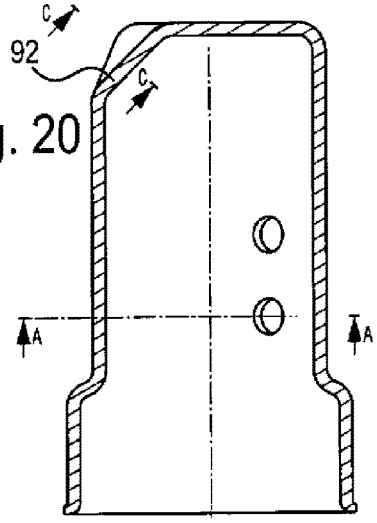
FIG. 20 is a lateral sectional view of the igniter sleeve of FIG. 19.
Figure 25:
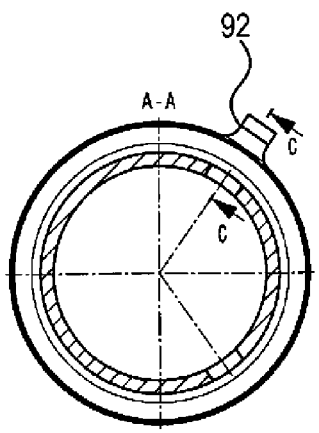
FIG. 25 is a sectional view along the line of cut A-A of FIG. 24.
Figure 26:
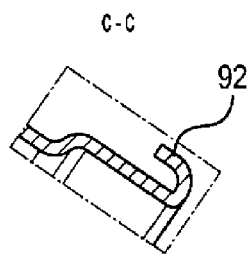
Figure 24:
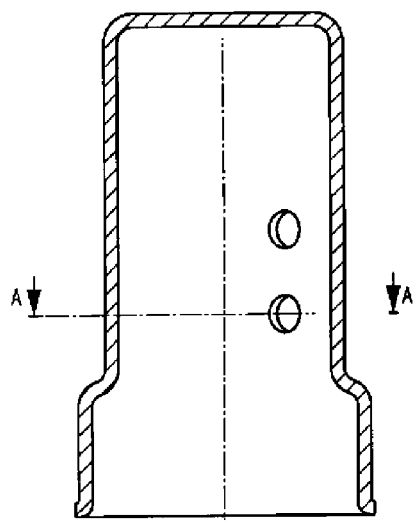
FIG. 24 is a lateral sectional view of the igniter sleeve of FIG. 23.
Figure 23:
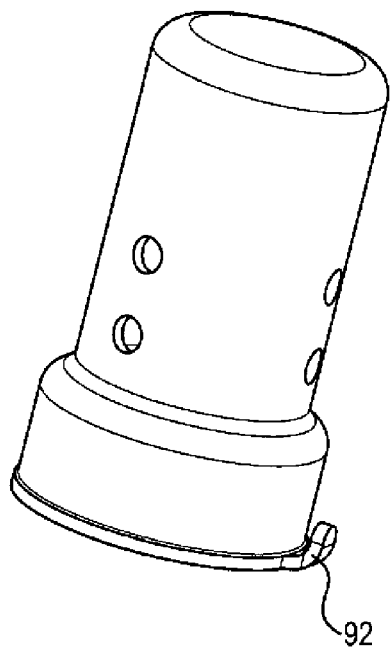
FIG. 23 is a perspective view of an igniter sleeve according to a fifth embodiment.

At a particular position the igniter carrier 30 or 32 has a milled slot as marker 90. The marker 90 provides an orientation of the igniter unit 26 or 28. A mounting tool used for assembling the inflator is designed so that it can receive the igniter unit 26 or 28 in a predetermined orientation only. When mounting the igniter unit 26 or 23, it is mounted in the desired orientation by means of the appropriate tool (cf. FIGS. 10 to 12).

FIGS. 13 to 26 show different embodiments of the igniter sleeve 33 which is arranged on the first igniter carrier 30 at a predetermined orientation. To this end, the igniter sleeve 38 has a marker 92 distant from its central axis B or extending non-symmetrical from the central axis B. By means of the marker 92 it is possible to ensure the correct orientation of the igniter sleeve 38 during attachment onto the first igniter unit 26.

In the embodiment of the igniter sleeve 33 shown in FIGS. 13 to 15 the marker 92 is in the form of a nose extending radially outwardly from a tapered portion 94 of the side wall 96 of the igniter sleeve 33. Similarly to the igniter unit 26 and 23 provided with the marker 90, a mounting tool used for assembling the inflator includes a recess corresponding to the nose so that the igniter sleeve 38 can be accommodated in the mounting tool at a predetermined orientation only. The mounting tool is adjusted such that when mounted the igniter sleeve 38 is attached to the first igniter carrier 30 at the orientation shown in FIG. 27.

In FIG. 16 another embodiment of the igniter sleeve 38 is shown. The bottom 40 of the igniter sleeve 38 is inclined at a predetermined angle vis-à-vis a plane perpendicular to the central axis B of the igniter sleeve 38. The slant of the igniter sleeve bottom 40 is adapted to the axial curvature of the ceiling portion 14 of the diffuser 10 so that the igniter sleeve 38 fits below the ceiling portion 14 of the diffuser 10 at the predetermined orientation only.

Further alternative embodiments of the igniter sleeve 38 having special markers 92 are illustrated in the FIGS. 17 and 18, 19 to 22 and 23 to 26.

When activating the first state of the inflator, the igniter sleeve 38 is moved upwards, i.e. in the direction of the ceiling portion 14 of the diffuser 10, by the pressure developed during combustion of the booster charge. The maximum movement of the igniter sleeve 38 is confined by the ceiling portion 14 of the diffuser 10 which in turn is deformed (bulging). In contrast to the combustion chamber sleeve 60 (as will be explained further below) the igniter sleeve 38 does not detach from the receiving portion of the first igniter carrier 30, i.e. by raising the igniter sleeve 38 no additional discharge orifice leading out of the igniter chamber 42 is formed.

All embodiments of the igniter sleeve 38 have in common that—related to the central axis B of the igniter sleeve 38—they have overflow orifices 98 unevenly spaced in circumferential direction. More precisely, the overflow orifices 98 are restricted to a particular area of the side wall 96 of the igniter sleeve 38. When the igniter sleeve 33 is attached to the first igniter carrier 30 at the predetermined orientation, the overflow orifices 98 are not directed directly to the filter 46. The central axes of the outer overflow orifices 98 in the particular area of the side wail 96 define in circumferential direction a limited angular range α for the discharge of the hot gas (igniting jets) when burning the booster charge in the igniter chamber 42 (cf. FIG. 15).

As indicated in FIG. 27, the angular range α extends to both sides of a connecting line between the central axis B of the igniter sleeve 38 and the portion of the filter 46 maximally distant from the central axis B. Especially the angular range α includes those areas of the first combustion chamber 44 filled with fuel which have a maximum distance from the filter 46 not blocked by components of the inflator. The angular range α is obtuse and is between 90° and 135°, preferably between 100° and 120°. In the shown embodiment according to FIG. 27 the angular range α is approx. 110°.

As is equally visible from FIG. 27, the angular range α also includes the combustion chamber sleeve 66. The overflow orifices 98 are disposed such that the emitting igniting jets are not directed directly to the combustion chamber sleeve 60, however, but mostly to areas in which as much fuel as possible is covered over an as large length as possible.

Figure 28:
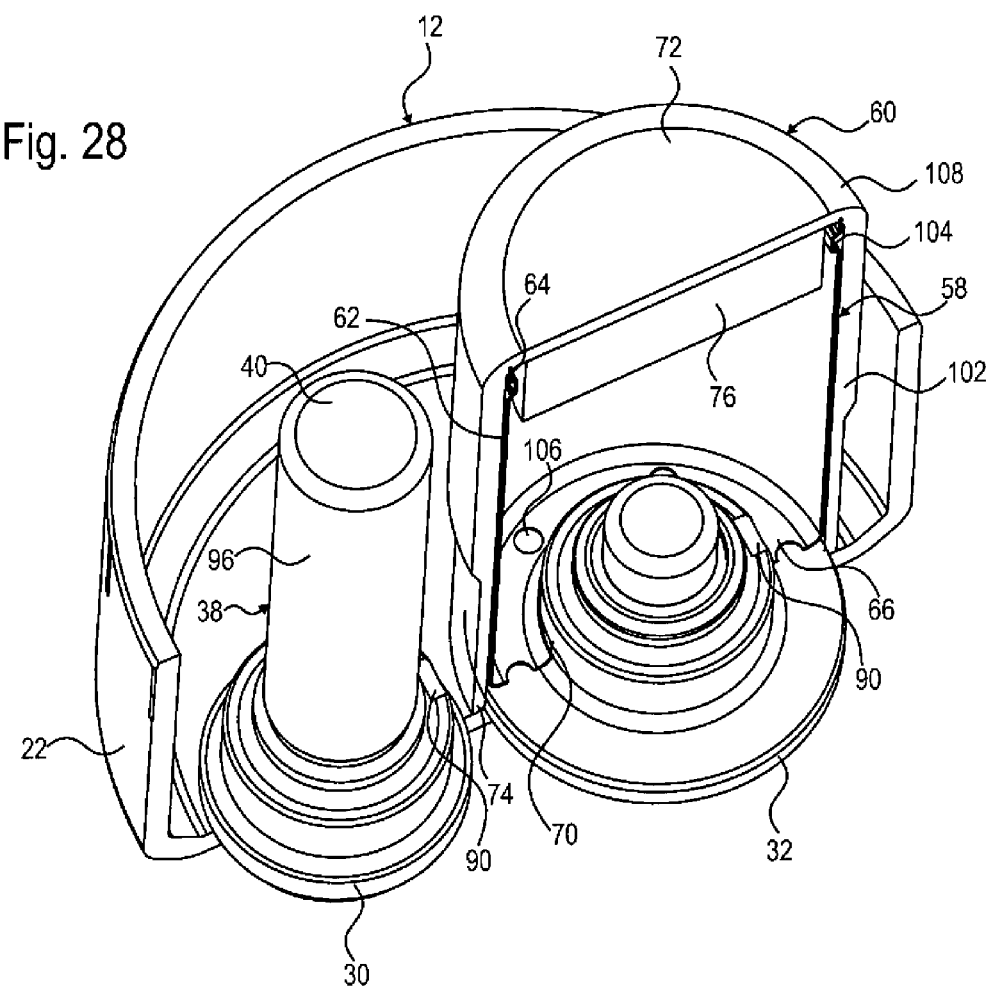
FIG. 28 is a sectional view along the line of cut C-C of FIG. 25.

From FIG. 28 the particular structure of the second combustion chamber 56 is evident. The bottom 66 of the fuel canister 58 is supported on a substantially horizontal surface of the second igniter carrier 32, and the bent edge portion 70 of the fuel canister bottom 66 is supported on a circumferential outer surface of the second igniter carrier 32. The fuel canister 58 thus stands stably and can conveniently be filled with fuel.

After filling the combustion chamber sleeve 60 is slipped with the second fill member 76 onto the fuel canister 58 at an opposite orientation (compared to the fuel canister 58). According to the shown embodiment, the fuel chamber sleeve 60 having a slightly larger axial height than the fuel canister 58 is slipped on until the free edge 74 of the open side of the combustion chamber sleeve 60 is held by the lower receiving portion of the second igniter carrier 32 and the fuel canister opening 64 (here: the open side) is completely covered by the combustion chamber sleeve bottom 72. Then the substantially cylindrical side walls 62, 102 of the fuel canister 58 and of the combustion chamber sleeve 60 are immediately opposed to each other, more precisely the loner shell of the side wall 102 of the combustion chamber sleeve covers the outer shell of the side wall 62 of the fuel canister substantially over the entire axial length of the two sleeves 58, 60.

In the vicinity of the fuel canister opening 64, approximately at the height of the second fill member 76 protruding into the fuel canister 58, in the side wail 62 of the fuel canister 58 a preferably completely circumferential bead 104 is embossed. The bead 104 serves for reinforcing the fuel canister 58, especially in the upper area close to the fuel canister opening 64.

In the fuel canister bottom 66 plural fuel canister bottom holes 106 are formed. The side wall 62 of the fuel canister 58, on the other hand, includes no openings or holes. The combustion chamber sleeve 60 slipped onto the fuel canister 58 is completely tree of holes, apart from its open side.

Prior to activating the second stage of the inflator, the second combustion chamber 56 is completely closed. In the case of activation of the second stage, the fuel burns off in the second combustion chamber 56 and the burning gas formed generates excessive pressure in the second combustion chamber 56. The combustion chamber sleeve 60 is forced toward the ceiling portion 14 of the diffuser 10 by the excessive pressure.

A marginal area 108 of the combustion chamber sleeve bottom 72 distant from the central axis A of the inflator contacts the ceiling portion 14 of the diffuser 10 either already in the non-activated state of the inflator or after a slight upward displacement of the combustion chamber sleeve 60. In each case the ceiling portion 14 which itself bulges due to the formation of gas restricts the axial movement of the combustion chamber sleeve 60.

Figure 29:
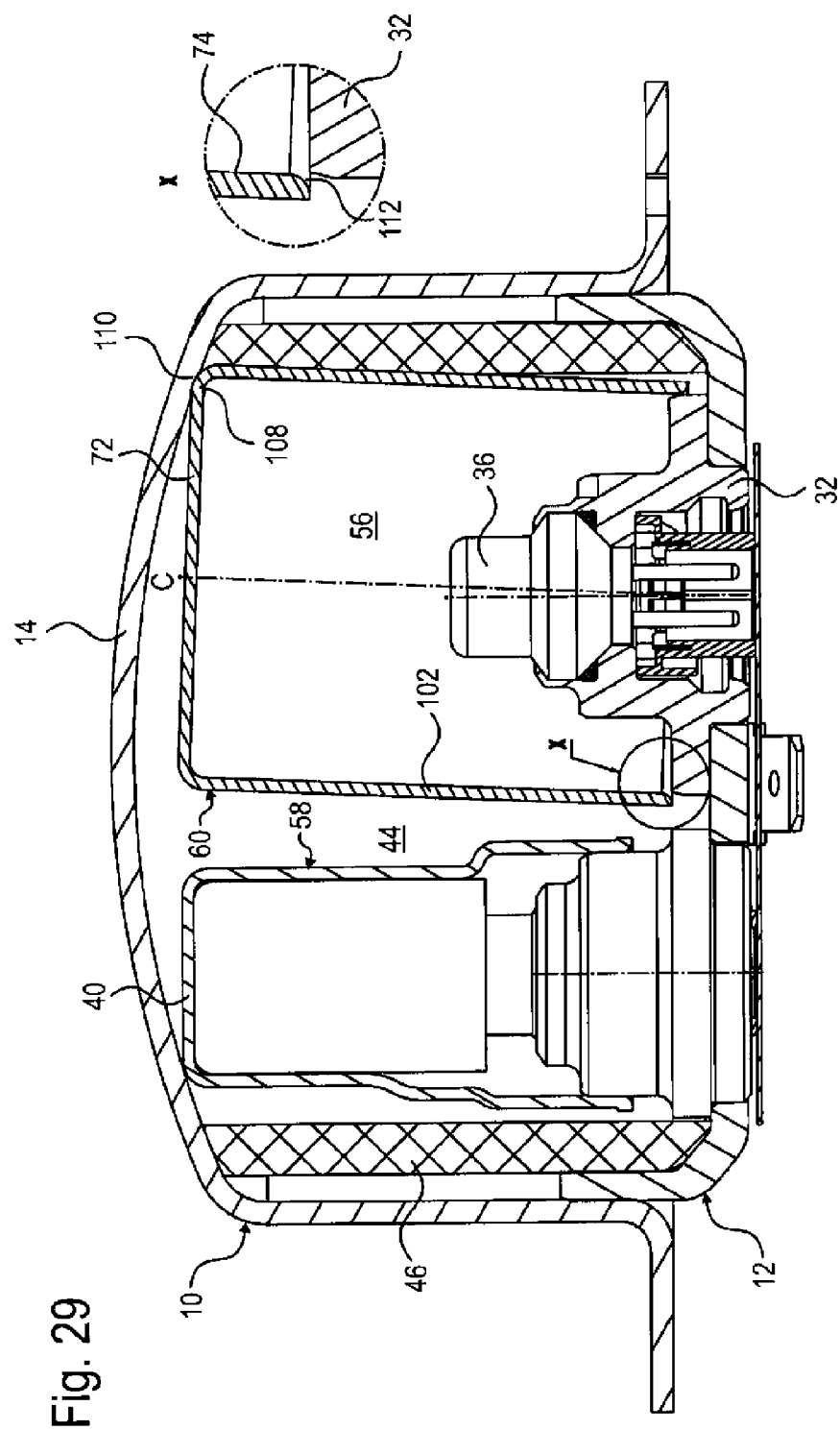
FIG. 29 is a lateral sectional view of an inflator according to the invention according to the second configuration after activation of the second activating stage.

Since the combustion chamber sleeve 60 is supported at the marginal area of the ceiling portion 14, due to the continuously provided pressure in the second combustion chamber 56 the combustion chamber sleeve 60 tilts about the contact point 110, as shown in FIG. 29. It is also possible that the combustion chamber sleeve 60 deforms unevenly in addition or alternatively to the tilting. In any case, a portion of the side wall 102 of the combustion chamber sleeve 60 facing away from the outer edge of the inflator is raised from the second igniter carrier 32 and releases a discharge gap 112 which is visible especially in the detailed magnification X of FIG. 29.

The gas formed during combustion of the fuel in the second combustion chamber 56 flows through the holes 106 in the fuel canister bottom 66 to the discharge gap 112 and through the same from the second combustion chamber 56 into the first combustion chamber 44. According to another embodiment of the fuel canister 58, initially the latter exhibits no fuel canister bottom holes 106; the holes are formed as late as by the pressure developed during combustion of the fuel and tearing of the fuel canister bottom 66 caused thereby.

Figure 30:
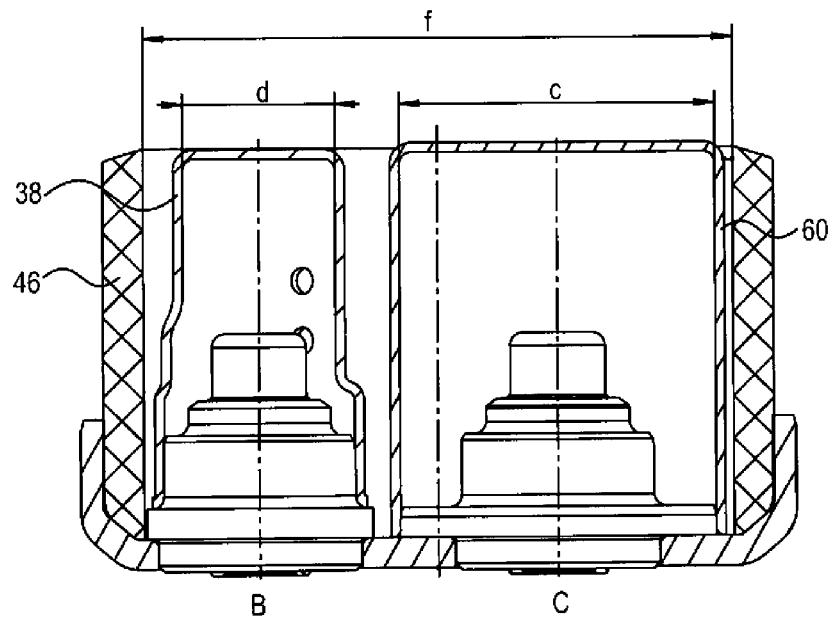
FIG. 30 is a lateral sectional view of an inflator according to the invention without diffuser and fill member.

The distance between the central axis B of the igniter sleeve 38 and the central axis C of the combustion chamber sleeve 60 represented in FIG. 30 in the mounted state ranges between 22.5 and 27.5 mm, preferably between 23.5 and 26.5 mm. In the shown embodiment this distance is approx. 25 mm.

The ratio of the minimum inner diameter c of the combustion chamber sleeve 60 to the minimum inner diameter d of the igniter sleeve 38 is between 1.64 and 2.83, preferably between 1.83 and 2.32, in the shown embodiment this ratio is approx. 2.06.

The first combustion chamber 44 of the inflator is radially confined, as mentioned already, at least partially by the circumferential filter 46. The ratio of the inner diameter f of the filter 46 to the minimum inner diameter d of the igniter sleeve 38 is between 3.19 and 4.76, preferably between 3.50 and 4.27. In the shown embodiment this ratio is approx. 3.85.

The ratio of the inner diameter f of the filter 46 to the minimum inner diameter c of the combustion chamber sleeve 60 is between 1.66 and 2.11, preferably between 1.76 and 1.99. In the illustrated embodiment this ratio is approx. 1.87.

The ratio of the outer diameter a of the inflator, more precisely the external housing (without taking the generator flange 18 into account), to the minimum inner diameter d of the igniter sleeve 38 is between 4.09 and 5.98, preferably between 4.46 and 5.39. In the shown embodiment this ratio preferably is approx. 4.89.

The ratio of the outer diameter a of the inflator to the minimum inner diameter c of the combustion chamber sleeve 60 is between 2.13 and 2.66, preferably between 2.24 and 2.5. In the shown embodiment this ratio amounts to approx. 2.38.

As can also be inferred from FIG. 30, the axial height of the contact area between the igniter sleeve 38 and the first igniter carrier 30 is larger than the axial height of the contact area between the combustion chamber sleeve and the second igniter carrier 32.

Figure 31:
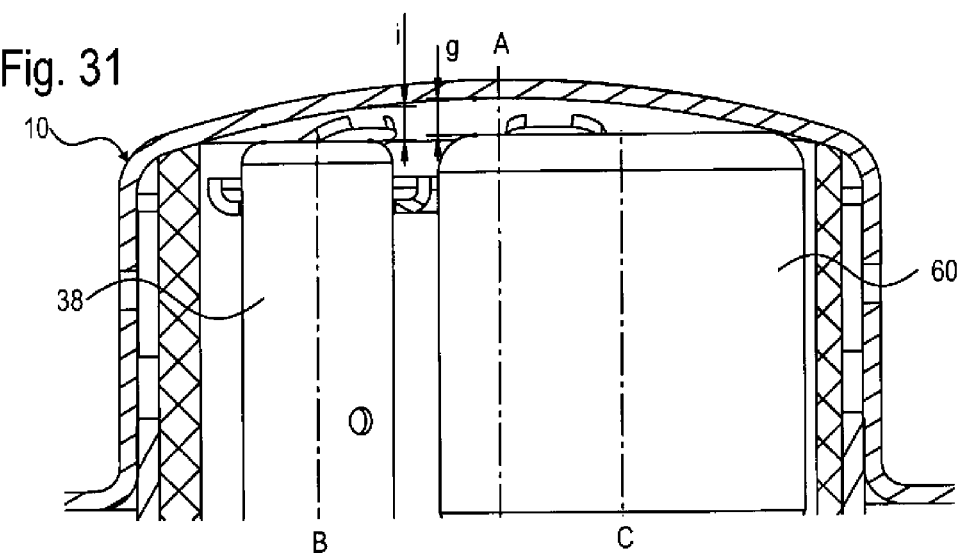
FIG. 31 shows a cut-out from a lateral sectional view of an inflator according to the invention.

In FIG. 31 the arrangement of the igniter sleeve 38 and the combustion chamber sleeve 60 relative to the ceiling portion 14 of the diffuser 10 is shown. Related to the central axis A of the diffuser 10, both the axial distance g between the combustion chamber sleeve 60 and the ceiling portion 14 and the axial distance i between the igniter sleeve 38 and the ceiling portion 14 are varying. In the shown embodiment the combustion chamber sleeve 60 contacts the ceiling portion 14 of the diffuser 10 already in the non-activated state of the inflator at the contact point 110 in the outer marginal area of the inflator.

The axial distance g between the combustion chamber sleeve 60 and the ceiling portion 14 of the diffuser 10 is largest at the central axis A of the diffuser 10 and continuously decreases with an increasing radial distance from the central axis A. The maximum distance g is between 2.3 and 3.7 mm, preferably between 2.7 and 3.3 mm. In the illustrated embodiment this maximum distance g is approx. 3.0 mm.

The axial distance i of the igniter sleeve 38 disposed next to the central axis A of the diffuser 10 is not constant either, but continuously decreases with an increasing radial distance from the central axis A of the diffuser 10. The maximum distance i between the igniter sleeve 38 and the ceiling portion 14 of the diffuser 10 is between 2.1 and 3.5 mm, preferably between 2.5 and 3.1 mm. In the illustrated embodiment this maximum distance i is approx. 2.8 mm.

In the FIGS. 32 and 33 one respective pad 114 of the first two-part fill member 82 of the second embodiment is shown which is arranged in the first combustion chamber 44 between the fuel and the ceiling portion 14 of the diffuser 10 and can be used both with the high first configuration (cf. FIG. 1) and with the flat second configuration (cf. FIG. 2). The first fill member 82 made of silicone can also be in one piece. In the two-part design of the first fill member 82 the two parts 114 preferably exhibit the double half-moon shape shown in FIGS. 32 and 33.

In the inserted state, the first fill member 82 has two recesses 116, 118 into which the igniter sleeve 38 and the combustion chamber sleeve 60 protrude. The smaller first recess 116 is circular and is adapted to the upper outer diameter of the igniter sleeve 38. The larger second recess 118 is equally circular and is adapted to the upper outer diameter of the combustion chamber sleeve 60.

The ratio of the diameter of the larger second recess 118 to the diameter of the smaller first recess 116 is between 1.52 and 2.25, preferably between 1.67 and 2.03. In the shown embodiment this ratio is approx. 1.84.

Figure 35:
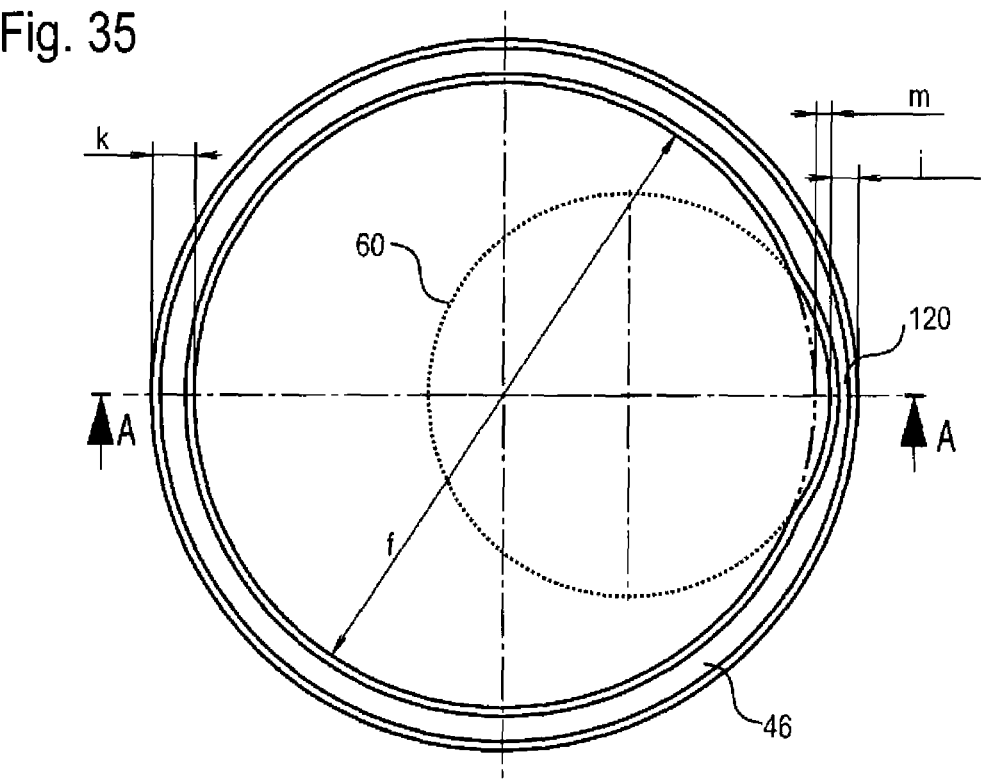
FIG. 35 is a top view of a filter of an inflator according to the invention.
Figure 36:
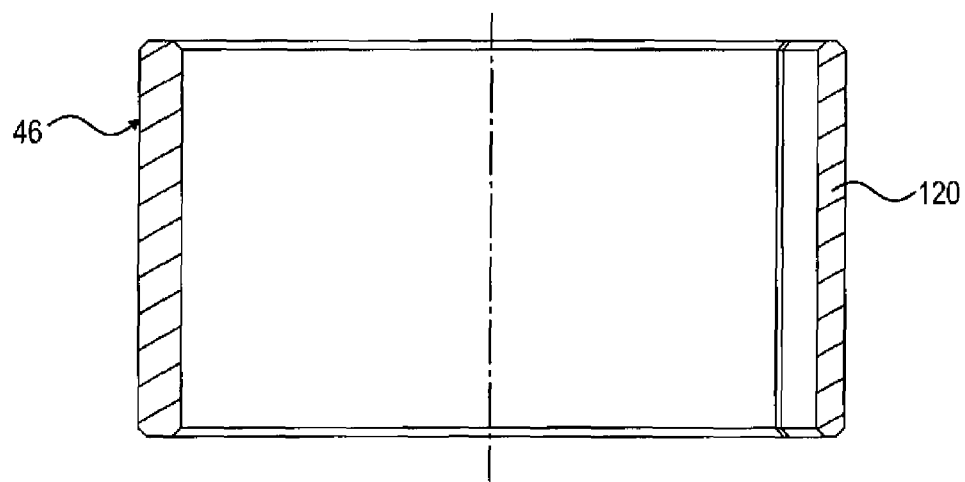
FIG. 36 is a sectional view of the filter along the line A-A in FIG. 35.

FIG. 34 is a section across the inflator according to the first configuration (cf. FIG. 1) showing the filter 46 in an upper area of the inflator. The filter 46 which is separately illustrated in FIGS. 35 and 36 includes a critical filter portion 120 which comes closer to the combustion chamber sleeve 60 than the other areas of the filter 46.

Said critical filter portion 120 has a reduced thickness compared to the adjacent areas of the filter 46. In this way a gap 122 is formed between the combustion chamber sleeve 60 and the critical filter portion 120. The critical filter portion 120 is compressed in radial direction, i.e. the filter material is more compressed in the critical filter portion 120 than in the adjacent areas.

The combustion chamber sleeve 60, on the other hand, exhibits an increased material thickness in the area opposed to the critical filter portion 120 (cf. also FIGS. 1 and 5). In the shown embodiment the upper part of the combustion chamber sleeve 60 is thickened over its complete circumference.

The ratio of the minimum radial thickness j of the critical filter portion 120 to the thickness k of the adjacent areas of the filter 46 is between 0.43 and 0.93, preferably between 0.53 and 0.78. In the shown embodiment this ratio is approx. 0.65.

The ratio of the minimum radial thickness j of the critical filter portion 120 to the maximum width m of the gap 122 between the combustion chamber sleeve 60 and the critical filter portion 120 is between 1.17 and 2.85, preferably between 1.50 and 2.23. In the shown embodiment this ratio is approx. 1.83.

Figure 37:
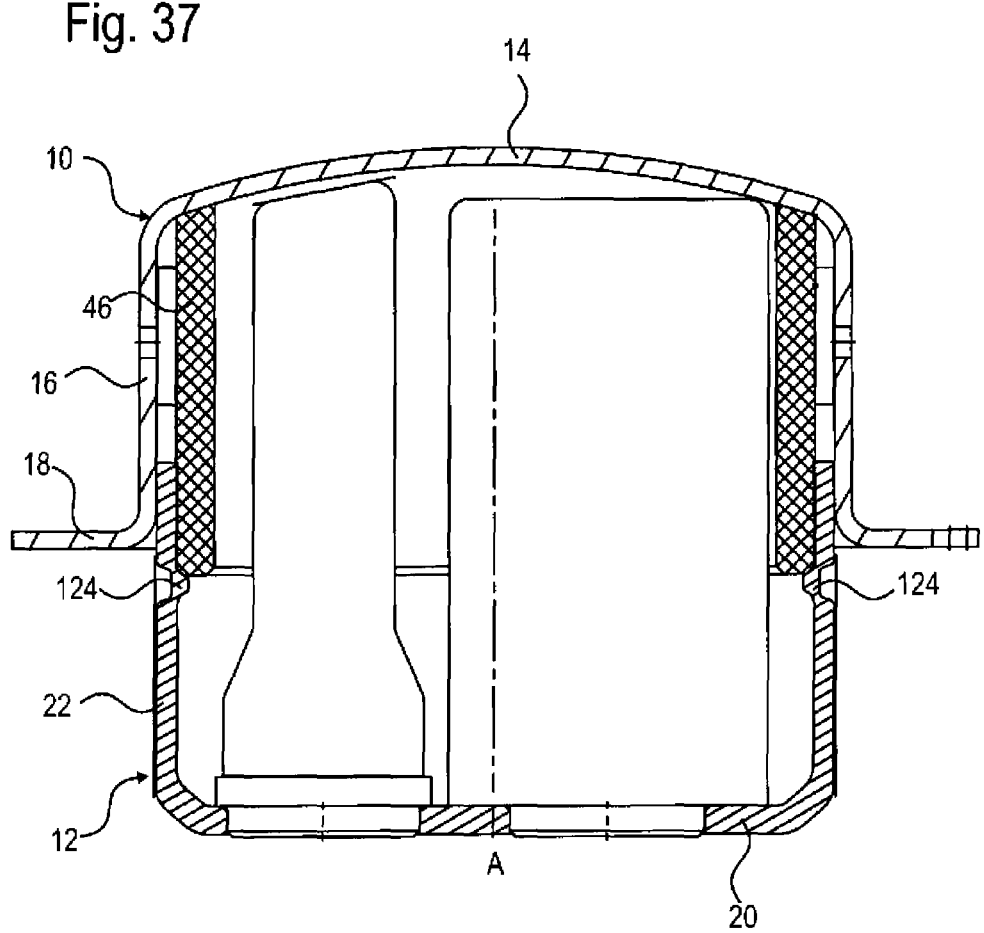
FIG. 37 is a schematic lateral sectional view of an inflator according to the invention in accordance with the first configuration in an embodiment.

As is evident from the FIGS. 1 and 2 as well as from FIG. 37, the filter 46 generally extends in axial direction beyond the circumferential wall 16 of the diffuser 10 extending in axial direction into the area of the closing member.

In the embodiment of the high first configuration of the inflator illustrated in FIG. 37 no separate support element 50 is provided for the filter 46. Rather, the pulled up edge 22 of the closing member 12 includes at least one supporting portion 124 constituting an axial support for the filter 46. The supporting portion 124 can be formed by a completely circumferential embossed bead or by plural beads spaced apart in circumferential direction. The filter 46 is supported on the supporting portion or portions 124 only by a radially outer area.

LIST OF REFERENCE NUMERALS 10 diffuser
12 closing member
14 ceiling portion
16 circumferential wall
18 generator flange
20 bottom
22 edge
24 bottom orifices
26 first igniter unit
28 second igniter unit
30 first igniter carrier
32 second igniter carrier
34 first igniter
36 second igniter
33 igniter sleeve
40 igniter sleeve bottom
42 igniter chamber
44 first combustion chamber
46 filter
48 annular gap
50 supporting element
52 first fill member (first embodiment)
54 finger-type portions 56 second combustion chamber
58 fuel canister
60 combustion chamber sleeve
62 fuel canister side wall
64 fuel canister opening
66 fuel canister bottom
63 fuel canister bottom opening
70 marginal portion
72 combustion chamber sleeve bottom
74 free combustion chamber sleeve edge
76 second fill member
78 discharge orifices
78a first discharge orifice (beginning of row)
78b last discharge orifice (end of row)
78c discharge orifice without opposite discharge orifice
78(1) discharge orifice having small flow cross-section
78(2) discharge orifice having medium flow cross-section
78(3) discharge orifice having large flow cross-section
80 transition area
82 first fill member (second embodiment)
84 tamping strip
86 packing ring
88 igniter carrier edge
90 marker of the igniter carrier
92 marker of the igniter sleeve
94 tapered portion
96 igniter sleeve side wall
98 overflow orifices
102 side wall of combustion chamber sleeve
104 bead
106 fuel canister bottom holes
108 marginal area of fuel chamber sleeve bottom
110 contact point
112 discharge gap
114 fill member pad
116 first recess of first fill member
118 second recess of first fill member
120 critical filter portion
122 gap
124 supporting portion
A central axis of inflator, diffuser and closing member
a outer diameter of inflator (without generator flange)
h1 axial height of external housing (first configuration)
h2 axial height of external housing (second configuration)
n number of discharge orifices in the row
M center of generator flange
l length of rectangular flange
b width of rectangular flange
B central axis of rectangular flange
α angular range
x connecting line
C central axis of combustion chamber sleeve and fuel canister
c minimum inner diameter of combustion chamber sleeve
d minimum inner diameter of igniter sleeve
f inner diameter of filter
g axial distance between combustion chamber sleeve and ceiling portion
i axial distance between igniter sleeve and ceiling portion
j minimum thickness of critical filter portion
k thickness of the remaining filter
m maximum width of gap

The invention claimed is:

1. An inflator for a protective device in a vehicle, comprising
a diffuser cooperating with a closing member to form an external housing of the inflator, wherein the diffuser includes a plurality of discharge orifices;
a combustion chamber component at least partially enclosing a combustion chamber; and
a ring-shaped filter extending about an axis and the combustion chamber, the filter including a critical filter portion positioned closest to the combustion chamber component that has a reduced radial thickness compared to a remainder of the filter such that the filter is asymmetric about the axis.

2. The inflator according to claim 1, wherein the radial cross-section of the critical filter portion is different from the radial cross-section of the remainder of the filter.

3. An inflator for a protective device in a vehicle, comprising
a diffuser forming a substantially rotation-symmetric external housing of the inflator with a closing member, wherein the diffuser includes a plurality of discharge orifices arranged in a row, and which are of circular shape; and
a filter and a combustion chamber component at least partially enclosing a combustion chamber, wherein the filter extends in a ring-shaped manner about an axis and the combustion chamber and includes a critical filter portion which is closer to the combustion chamber component than a remaining area of the filter, wherein the critical filter portion has a reduced thickness compared to areas of the filter that are adjacent to the critical filter portion such that the filter is asymmetric about the axis.

4. The inflator according to claim 3, wherein between the combustion chamber component and the critical filter portion a gap is formed;
wherein a material of which the filter is made is compressed more highly in the critical filter portion than in the adjacent areas;
wherein the combustion chamber component has an increased material thickness at least in an area opposed to the critical filter portion;
wherein the filter extends along a circumferential wall of the inflator surrounding a chamber of the inflator in which the combustion chamber component is disposed; and
wherein the combustion chamber component extends over a larger axial height than the filter, the combustion chamber component substantially exhibiting an increased material thickness only in an axial area in which also the filter extends.

5. The inflator according to claim 3, wherein a gap is formed between the combustion chamber component and the critical filter portion;
wherein a ratio of the minimum thickness (j) of the critical filter portion to a thickness of the adjacent areas of the filter is between 0.43 and 0.93;
wherein a ratio of a minimum thickness of the critical filter portion to a maximum width of the gap is between 1.17 and 2.85; and
wherein the inflator is closed at a first axial end face by a substantially axially extending circumferential wall of the diffuser, wherein the filter extends in an axial direction beyond the circumferential wall.

6. The inflator according to claim 3, further comprising a radially projecting generator flange, related to a central axis (A) of the inflator, for mounting the inflator to a support, wherein the generator flange is substantially rectangular;

wherein a ratio of a length (l) to the width (b) of the rectangle ranges between 1.12 and 1.31;

wherein a ratio of the length (l) of the rectangle to an outer diameter (a) of the external housing ranges between 1.24 and 1.48; and wherein a ratio of the width (b) of the rectangle to the outer diameter (a) of the external housing is between 1.01 and 1.23.

7. The inflator according to claim 3, wherein at least in portions a wall thickness of the closing member is larger than that of the diffuser, wherein the closing member has a substantially planar bottom in which at least one opening for receiving an igniter carrier is formed and that at least the bottom has a larger wall thickness than the diffuser.

8. The inflator according to claim 3, wherein the diffuser includes a ceiling portion and the combustion chamber component contacts the ceiling portion of the diffuser in a non-activated state of the inflator at least at one point, and wherein, related to a central axis (A) of the diffuser, an axial distance between the combustion chamber component and the ceiling portion is varying such that a maximum distance between the combustion chamber component and the ceiling portion of the diffuser is between 2.3 and 3.7 mm.

9. The inflator according to claim 3, wherein an igniter sleeve offset with respect to a central axis (A) of the diffuser whose axial distance (i) from a ceiling portion of the diffuser is varying such that the maximum distance (i) between the igniter sleeve and the ceiling portion of the diffuser is between 2.1 and 3.5 mm.

10. An airbag module for a vehicle comprising an airbag having a volume of 40 to 60 liters, comprising an inflator according to claim 3.

11. An airbag module for a vehicle comprising an airbag having a volume of 60 to 135 liters, comprising inflator according to claim 3.

12. The inflator according to claim 3, wherein the radial cross-section of the critical filter portion is different from the radial cross-section of the remainder of the filter.

13. The inflator according to claim 3, further comprising an igniter unit, wherein the igniter unit has a marker, wherein the marker is a milled slot, and wherein the marker sets a predetermined orientation of connecting pins of the igniter unit.

14. The inflator according to claim 13, wherein the igniter unit is a pre-assembled unit having an igniter carrier and an igniter held therein which is adapted to be inserted in a bottom orifice of the closing member of the inflator.

15. The inflator according to claim 3, further comprising a fuel canister filled with fuel including a fuel canister bottom and a fuel canister opening opposed to the fuel canister bottom which is closed by the combustion chamber component.

16. The inflator according to claim 15, wherein the combustion chamber component is a combustion chamber sleeve which encloses at least partially the combustion chamber associated with a particular activating stage of the inflator, wherein the combustion chamber sleeve exhibits a combustion chamber sleeve opening or an open side and a combustion chamber sleeve bottom opposed thereto which covers the fuel canister opening, wherein a second fill member connected to the combustion chamber sleeve bottom is arranged at the combustion chamber sleeve bottom; and wherein at least part of a side wall of the fuel canister extending between the fuel canister opening and the fuel canister bottom is directly opposed to at least part of a side wall of the combustion chamber sleeve extending between the combustion chamber sleeve orifice or the open side of the combustion chamber sleeve and the combustion chamber sleeve bottom.

17. The inflator according to claim 15, wherein the fuel canister and the combustion chamber component are two open substantially cylindrical sleeves which are inserted into each other at opposed orientation so that an inner or outer shell of the fuel canister and an outer or inner shell of the combustion chamber component substantially cover each other over an entire axial length of the shells, the combustion chamber component being slipped onto an outside of the fuel canister.

18. The inflator according claim 15, wherein in the fuel canister bottom a central fuel canister bottom opening is formed for receiving an igniter carrier, wherein the fuel canister bottom opening is formed by a bent inner edge portion extending from the fuel canister bottom into an interior of the fuel canister.

19. The inflator according to claim 15, wherein plural holes are formed in the fuel canister bottom, and wherein the combustion chamber component is free of holes, apart from a combustion chamber component orifice or the open side, and wherein the combustion chamber component is slipped onto an igniter carrier.

20. An inflator for a protective device in a vehicle, comprising:

a diffuser forming a substantially rotation-symmetric external housing of the inflator with a closing member, wherein the diffuser includes a plurality of discharge orifices arranged in a row, and which are of circular shape;

a filter and a combustion chamber component at least partially enclosing a first combustion chamber, wherein the filter extends in a ring-shaped manner about the first combustion chamber and includes a critical filter portion which is closer to the combustion chamber component than a remaining area of the filter, wherein the critical filter portion has a reduced thickness compared to areas of the filter that are adjacent to the critical filter portion;

wherein the first combustion chamber is filled with fuel which is associated with a first activating stage of the inflator and is closed on one side by the diffuser, wherein a first fill member is disposed between the fuel and the diffuser, wherein the first fill member has at least one circular recess into which an igniter sleeve associated with the first activating stage of the inflator or a combustion chamber sleeve associated with a second activating stage of the inflator projects;

wherein the first fill member has two recesses of different size, wherein the igniter sleeve projects into a smaller recess and the combustion chamber sleeve projects into a larger recess;

wherein a ratio of the diameter of the larger recess to the diameter of the smaller recess is between 1.52 and 2.25; and wherein the first fill member is designed in at least two parts that each has a shape of a double half moon.

* * * * *